(12) United States Patent
Omojola et al.

(10) Patent No.: US 10,748,135 B2
(45) Date of Patent: Aug. 18, 2020

(54) OFFLINE ONBOARDING OF TRACKABLE TRANSACTION INSTRUMENT WITH ASSOCIATED PROFILE

(71) Applicant: Square, Inc., San Francisco, CA (US)

(72) Inventors: Ayokunle Omojola, San Francisco, CA (US); Ashutosh Sham Dhodapkar, Fremont, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 16/206,834

(22) Filed: Nov. 30, 2018

(65) Prior Publication Data
US 2020/0175495 A1    Jun. 4, 2020

(51) Int. Cl.
*G06Q 20/32* (2012.01)
*G06Q 20/34* (2012.01)
*G06K 19/06* (2006.01)
*G06Q 20/20* (2012.01)
*G06Q 20/42* (2012.01)
*H04L 29/08* (2006.01)
*H04W 4/80* (2018.01)

(52) U.S. Cl.
CPC ....... *G06Q 20/3276* (2013.01); *G06Q 20/202* (2013.01); *G06Q 20/204* (2013.01); *G06Q 20/3221* (2013.01); *G06Q 20/3278* (2013.01); *G06Q 20/341* (2013.01); *G06Q 20/42* (2013.01); *H04L 67/306* (2013.01); *G06K 19/06028* (2013.01); *G06K 19/06037* (2013.01); *G06K 2019/06253* (2013.01); *H04W 4/80* (2018.02)

(58) Field of Classification Search
CPC .................................................... G06Q 20/00

USPC ........................................................... 705/17
See application file for complete search history.

(56) References Cited

U.S. PATENT DOCUMENTS

| | | | |
|---|---|---|---|
| 2,666,655 | A | 1/1954 | Wolowitz |
| 3,217,643 | A | 11/1965 | Crissy et al. |
| 3,601,913 | A | 8/1971 | Pollock et al. |
| 5,221,838 | A | 6/1993 | Gutman et al. |
| D358,419 | S | 5/1995 | Runyan |
| D387,802 | S | 12/1997 | Finkelstein et al. |
| D406,861 | S | 3/1999 | Leedy, Jr. |

(Continued)

FOREIGN PATENT DOCUMENTS

| | | |
|---|---|---|
| WO | 2007/008686 A2 | 1/2007 |
| WO | 2016/033165 A1 | 3/2016 |
| WO | 2018/063809 A1 | 4/2018 |

OTHER PUBLICATIONS

Non-Final Office Action dated Sep. 15, 2016, of U.S. Appl. No. 15/199,457, for Grassadonia, B., et al., filed Jun. 30, 2016.

(Continued)

*Primary Examiner* — Luna Champagne
(74) *Attorney, Agent, or Firm* — Polsinelli, PC

(57) ABSTRACT

A transaction card associated with a payment service may be purchased by a customer without the customer having a user profile with the payment service. The user scans a card identifier from the transaction card or from the transaction card's packaging using a mobile device, which then sends the card identifier to the payment service. The payment service may use the card identifier to generate a user profile that the payment service can automatically link to the transaction card. The user can track transactions made using the transaction card via the user profile.

20 Claims, 13 Drawing Sheets

(56) References Cited

U.S. PATENT DOCUMENTS

| | | | |
|---|---|---|---|
| 5,892,900 | A | 4/1999 | Ginter et al. |
| D438,563 | S | 3/2001 | Webb et al. |
| D462,714 | S | 9/2002 | Creighton |
| 6,601,049 | B1 | 7/2003 | Cooper |
| D486,515 | S | 2/2004 | True |
| D498,788 | S | 11/2004 | Lubking |
| 7,433,499 | B2 | 10/2008 | Kim |
| 7,567,936 | B1 | 7/2009 | Peckover et al. |
| 7,693,745 | B1 | 4/2010 | Pomerantz et al. |
| D620,975 | S | 8/2010 | Skelding et al. |
| D622,315 | S | 8/2010 | Skelding et al. |
| D628,236 | S | 11/2010 | Skelding et al. |
| D635,186 | S | 3/2011 | Skelding et al. |
| D643,062 | S | 8/2011 | Skelding et al. |
| D665,851 | S | 8/2012 | Davis |
| 8,700,905 | B2 | 4/2014 | Guenther |
| D767,024 | S | 9/2016 | O'Shea et al. |
| 9,741,036 | B1 | 8/2017 | Grassadonia et al. |
| 9,836,736 | B1 | 12/2017 | Neale et al. |
| D813,302 | S | 3/2018 | Getachew et al. |
| 10,032,325 | B1 | 7/2018 | Westen et al. |
| 10,157,397 | B2 | 12/2018 | Walz |
| 10,510,057 | B2 * | 12/2019 | Priebatsch ......... G06Q 20/3672 |
| 2002/0046169 | A1 | 4/2002 | Keresman, III et al. |
| 2006/0206425 | A1 * | 9/2006 | Sharma .................. G06Q 20/02 705/40 |
| 2007/0022303 | A1 | 1/2007 | Awatsu et al. |
| 2009/0299864 | A1 * | 12/2009 | Newbrough ........... G06Q 20/18 705/17 |
| 2010/0089998 | A1 | 4/2010 | Sandstrom et al. |
| 2011/0099088 | A1 | 4/2011 | Berrios et al. |
| 2011/0306368 | A1 | 12/2011 | McCarthy |
| 2012/0259768 | A1 | 10/2012 | Mukherjee |
| 2012/0278189 | A1 * | 11/2012 | Goldberg ............... G06Q 20/06 705/17 |
| 2012/0296818 | A1 | 11/2012 | Nuzzi et al. |
| 2013/0024361 | A1 | 1/2013 | Choudhuri et al. |
| 2013/0166441 | A1 * | 6/2013 | Kobylkin ............ G06Q 20/354 705/39 |
| 2013/0254284 | A1 | 9/2013 | Dougherty et al. |
| 2013/0346314 | A1 | 12/2013 | Mogollon et al. |
| 2014/0122988 | A1 | 5/2014 | Eigner et al. |
| 2014/0249947 | A1 | 9/2014 | Hicks et al. |
| 2015/0134468 | A1 * | 5/2015 | Dixon .................... G06Q 10/08 705/16 |
| 2015/0170241 | A1 | 6/2015 | Jacobsen et al. |
| 2015/0278801 | A1 * | 10/2015 | Friedlander ........ G06Q 30/0207 705/41 |
| 2015/0371219 | A1 | 12/2015 | Ljujic |
| 2016/0063484 | A1 | 3/2016 | Carpenter et al. |
| 2016/0275486 | A1 | 9/2016 | Liu et al. |
| 2017/0154341 | A1 | 6/2017 | Gilbertson |
| 2017/0372415 | A1 * | 12/2017 | He ......................... G06Q 40/02 |
| 2018/0096340 | A1 | 4/2018 | Omojola et al. |
| 2018/0150823 | A1 | 5/2018 | Omojola et al. |
| 2019/0034889 | A1 * | 1/2019 | Brock .................. G06Q 20/065 |
| 2019/0172055 | A1 * | 6/2019 | Hale ...................... G06Q 20/32 |

OTHER PUBLICATIONS

Notice of Allowance dated Apr. 21, 2017, of U.S. Appl. No. 15/199,457, for Grassadonia, B., et al., filed Jun. 30, 2016.
Non-Final Office Action dated Jul. 27, 2017, for U.S. Appl. No. 14/453,551, of Brock, Z., filed Aug. 6, 2014.
Non-Final Office Action dated Sep. 20, 2017, for U.S. Appl. No. 15/679,968, of Grassadonia, B., et al., filed Aug. 17, 2017.
Non-Final Office Action dated Dec. 8, 2017, for U.S. Appl. No. 15/382,132, of Westen, P., et al., filed Dec. 16, 2016.
Notice of Allowance dated Jan. 8, 2018, for U.S. Appl. No. 15/679,968, of Grassadonia, B., et al., filed Aug. 17, 2017.
Final Office Action dated Feb. 9, 2018, for U.S. Appl. No. 14/453,551, of Brock, Z., filed Aug. 6, 2014.
Notice of Allowance dated Mar. 26, 2018, for U.S. Appl. No. 15/382,132, of Westen, P., et al., filed Dec. 16, 2016.
Notice of Allowance dated May 31, 2018, for U.S. Appl. No. 15/679,968, of Grassadonia, B., et al., filed Aug. 17, 2017.
Non Final office action dated Jun. 15, 2018, for U.S. Appl. No. 15/721,212, of Omojola, A., et al., filed Sep. 29, 2017.
Ex Parte Quale Action mailed Sep. 19, 2018, for Design U.S. Appl. No. 29/586,095, of Omojola, A., et al., filed Nov. 30, 2016.
Non-Final Office Action dated Nov. 13, 2018, for U.S. Appl. No. 29/586,087, of Omojola, A., et al., filed Nov. 30, 2016.
Final Office Action dated Nov. 15, 2018, for U.S. Appl. No. 15/721,212, of Omojola, A., et al., filed Sep. 29, 2017.
Non-Final Office Action dated Feb. 21, 2019, for U.S. Appl. No. 14/453,551 of Brock, Z., filed Aug. 6, 2014.
Non-Final Office Action dated Mar. 7, 2019, for Design U.S. Appl. No. 29/586,095, of Omojola, A., et al., filed Nov. 30, 2016.
International Search Report and Written Opinion for International Application No. PCT/US2017/051468, dated Nov. 22, 2017.
Examiner Requisition for Canadian Design Application No. 184337 dated Oct. 2, 2019.
Non-Final Office Action dated Nov. 27, 2019, for U.S. Appl. No. 15/721,212, of Omojola, A., et al., filed Sep. 29, 2017.
Advisory Action dated Dec. 18, 2019, for U.S. Appl. No. 14/453,551, of Brock, Z., filed Aug. 6, 2014.
Non-Final Office Action dated Jun. 27, 2019, for U.S. Appl. No. 15/282,759, of Omojola, A., et al., filed Sep. 30, 2016.
Final Office Action dated Aug. 22, 2019, for Design U.S. Appl. No. 29/586,087, of Omojola, A., et al., filed Nov. 30, 2016.
Final Office Action dated Aug. 22, 2019, for Design U.S. Appl. No. 29/586,095, of Omojola, A., et al., filed Nov. 30, 2016.
Final Office Action dated Sep. 17, 2019, for U.S. Appl. No. 14/453,551, of Brock, Z., filed Aug. 6, 2014.

* cited by examiner

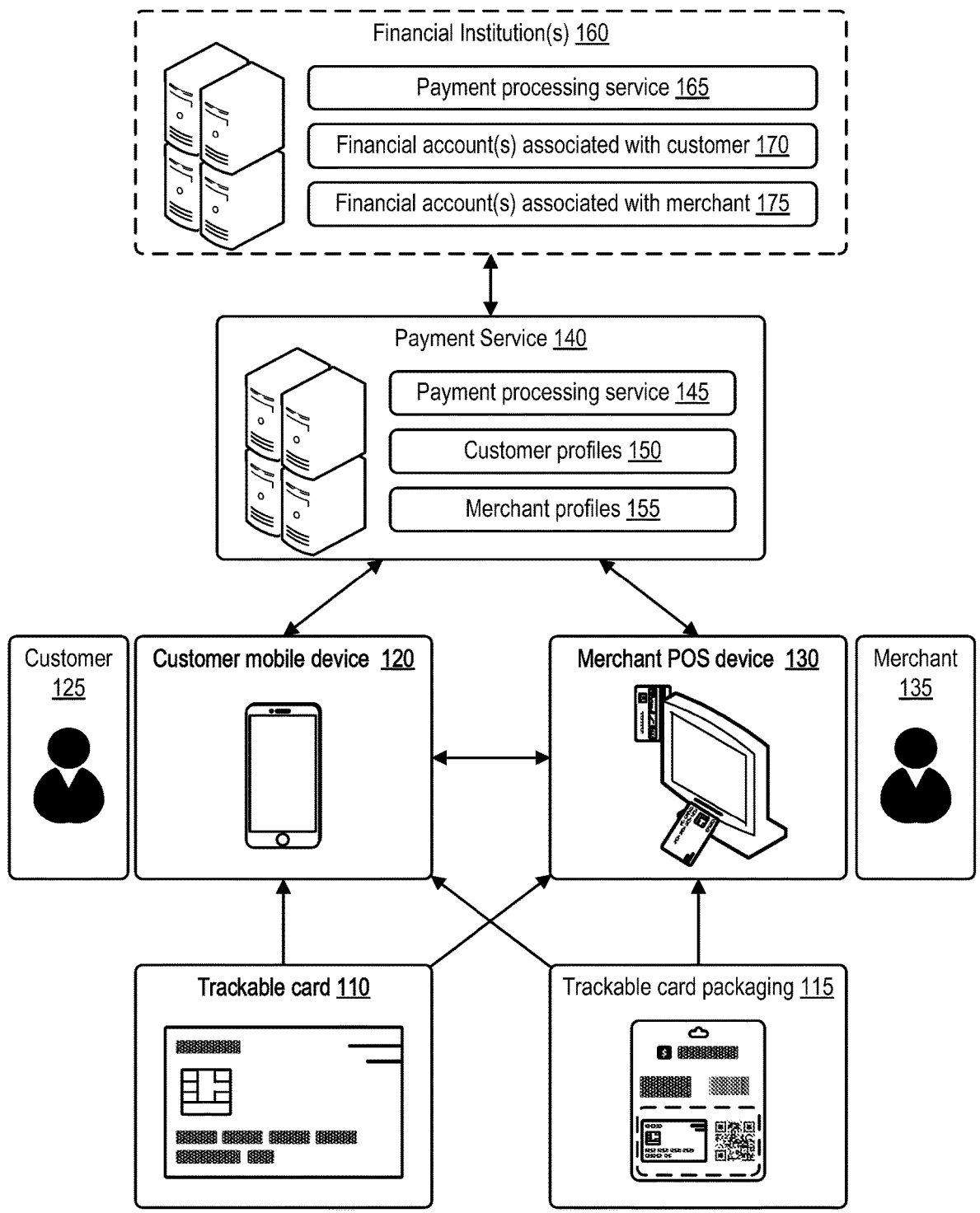

OFFLINE ONBOARDING OF TRACKABLE TRANSACTION INSTRUMENT WITH ASSOCIATED PROFILE

BACKGROUND

Credit cards and debit cards are often used as payment cards by consumers during transactions with merchants. Merchants read such payment cards using point of sale (POS) terminals during the transaction. Payment cards store payment information on a storage medium located on a surface of the card or within the card, such as a magnetic stripe or a integrated circuit (IC) chip compliant with Europay/Mastercard/Visa (EMV) standards. POS terminals read the payment information from the storage medium of a payment card, typically following insertion of the payment card into a slot of the POS terminal that includes an IC chip reader, or following swiping of the payment card through a slot of the POS terminal that includes a magnetic stripe reader. The payment information stored on a payment card and read by a POS device is typically sent by the POS device to a financial institution, which is able to identify a particular payment account using the payment information, such as a customer's bank account if the payment card is a debit card, or a bank account associated with a credit card institution that the customer is engaged with if the payment card is a credit card. To complete the transaction, funds are drawn from the account and transferred to an account associated with the merchant.

Payments cards such as credit cards and debit cards are types of transaction cards, which may also include cards used for transactions other than payments, such as public transit cards that authorize transit and optionally track transit, identification or entry cards that authorize access to a computer system and/or entry/exit to/from a physical area, and the like. Other types of transaction objects or transaction instruments may exist other than cards, such as badges, key fobs, and the like.

More recently, cardless transaction solutions have become available, in which customers typically use a mobile device, such as a smartphone, as a transaction instrument in place of a transaction card. Cardless transaction solutions can be very convenient for customers, who no longer need to bring transaction cards with them. However, cardless transaction solutions can be difficult for new users to adopt and use, and compatibility is an issue as a large number of POS terminals still do not accept payment instruments that are not payment cards.

Therefore, it would be useful to integrate benefits enabled by cardless transaction infrastructure enables within the framework of the payment card infrastructure in a manner that is easy and intuitive for customers to adopt and to use.

BRIEF DESCRIPTION OF THE DRAWINGS

FIG. 1 illustrates a system architecture including a payment service network used for onboarding a trackable transaction card that is newly obtained by a customer from a merchant via interactions with a customer mobile device and/or a merchant point of sale (POS) device.

DETAILED DESCRIPTION

A transaction card associated with a payment service may be purchased by a customer without the customer having a user profile with the payment service. The user scans a card identifier from the transaction card or from the transaction card's packaging using a mobile device, which then sends the card identifier to the payment service. The payment service may use the card identifier to instantly/automatically generate a user profile that the payment service can automatically link to the transaction card. The user can track transactions made using the transaction card via the user profile.

Examples of the subject matter technology disclosed herein provide a number of technical improvements over the traditional methods, which suffered from technical problems. For example, the processes described herein provide a benefit of increased processing speed and efficiency over traditional methods in generating accounts or profiles and onboarding a card or other payment instrument at least because account or profile info and card balances are pre-configured before the user's mobile device ever downloads an app associated with the payment service and without the user having to input information or perform any account/profile setup manually. Memory management is also improved, as card information, balances, and user profile information are tracked together with account and profile information once an account or profile is created, and are kept together even before the account or profile is created. Furthermore, flexibility and ease of use are improved, as cards may be used immediately before an account or profile is ever created, and purchases made both before and after account creation can be tracked once an account/profile is eventually created. The profiles created herein thus allow access to be tailored for different users, and do so in an automated fashion. Conventional methods of card onboarding were slower, less organized and efficient as data was more scattered across systems, and less flexible as cards typically could not be used until an account or profile was made.

FIG. 1 illustrates a system architecture including a payment service network used for onboarding a trackable transaction card that is newly obtained by a customer from a merchant via interactions with a customer mobile device and/or a merchant point of sale (POS) device.

Figure 8:
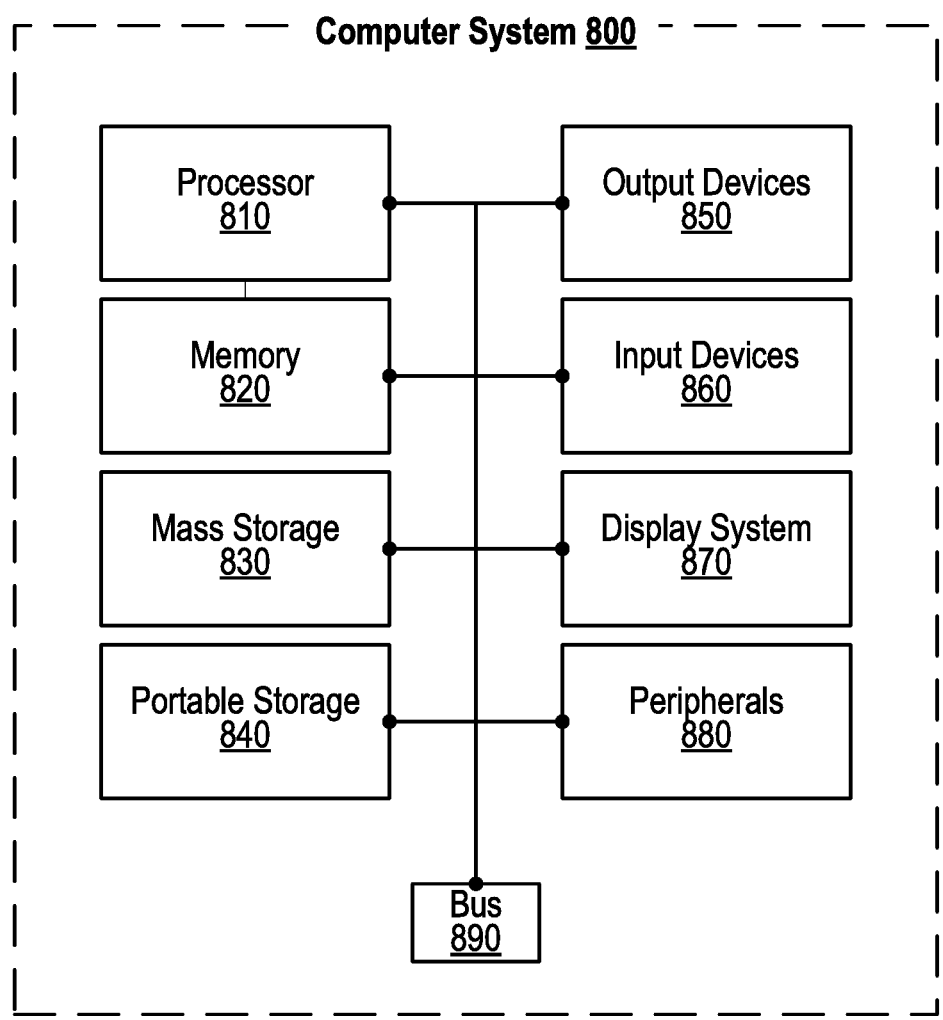
FIG. 8 is a block diagram illustrating components that may be present in computing devices and/or circuitry implementing the present technologies.

The system architecture of FIG. 1 includes a payment service 140 comprising one or more servers, each of which may be computing devices 800 as discussed with respect to FIG. 8, or may include at least a subset of the components identified in FIG. 8. The payment service 140 interacts with a number of other devices, including a customer mobile device 120 belonging to or otherwise associated with a customer 125 and a merchant point of sale (POS) device/terminal 130 belonging to or otherwise associated with a merchant 135.

The system architecture of FIG. 1 also includes a trackable card 110. The trackable card 110 may function as a credit card, as a debit card, as an automated teller machine (ATM) card, as a gift card, or some combination thereof. The trackable card 110 is purchased by the customer 125 from the merchant 135. The transaction in which the trackable card 110 is purchased is processed by/using the merchant POS device 130 and optionally using the payment processing service 145 of the payment service 140 and/or the payment processing service 165 of the financial institution(s) 160 in order to transfer funds from one or more financial accounts 170 associated with the customer 125 to one or more financial accounts 175 associated with the merchant 135. The financial institution(s) 160 may be banks, credit unions, credit card institutions, debit card institutions, lenders, or combinations thereof. The one or more financial accounts 170 associated with the customer 125 may be bank accounts, credit union accounts, savings accounts, checking accounts, credit card accounts, debit card accounts, or some combination thereof. Alternately, the customer 125 may purchase the transaction card 110 from the merchant using cash that whose receipt is confirmed by the merchant 135 using the merchant POS device 130.

The trackable card 110 may be packaged within a packaging 115 for the trackable card. That is, the card 110 may be at least partially enclosed by, or at least partially covered by, at least partially affixed to, at least partially attached to, at least partially coupled to, at least partially connected to, and/or at least partially adhered to the packaging 115. The trackable card packaging 115 is illustrated in and described further with respect to FIG. 2A-2D, FIG. 3A, and FIG. 3B.

During the transaction in which the customer 125 purchases the trackable card 110, the merchant POS device 130 may read a first card identifier from the trackable card 110 and/or from the trackable card packaging 115. This corresponds to step 605 in FIG. 6. For example, the merchant POS device 130 may visually scan an optical glyph such as a quick response (QR) code or barcode on the card 110 and/or on the packaging, the optical glyph encoding the first card identifier. The merchant POS device 130 may alternately or additionally receive the first card identifier from a passive or active short-range wireless transmitter/transceiver/tag/circuitry, such as a passive or active near field communication (NFC) transmitter/transceiver/tag/circuitry, or a transmitter/transceiver/tag/circuitry of any of the types described with respect to the transmitters and transceivers of the output devices 850 of FIG. 8 (including but not limited to Bluetooth® or Bluetooth Low Energy®). The first card identifier may be a card number such as a credit card number or debit card number, a card security identifier such as a card expiration date, card verification value (CVV), or card verification code (CVC), or it may be an identifier other than a card number and/or a card security identifier, such as an identifier specific to an optical glyph or NFC tag within the packaging 115 and/or 110. Each transaction card 110 and/or packaging 115 corresponds to a different unique first card identifier.

Once the merchant POS device 130 reads the first card identifier from the transaction card 110 and/or packaging 115, it sends the first card identifier to the payment service 140, which then understands that the particular transaction card 110 corresponding to the unique first card identifier has been purchased via the merchant POS device 130. This corresponds to steps 610 and 615 in FIG. 6. During the transaction in which the customer 125 purchases the transaction card 110 from the merchant 135, the customer may pay at least an amount corresponding to a balance of the transaction card 110. For example, the customer 125 may pay a total of $115 to purchase the transaction card 110, of which $100 becomes a balance of the transaction card (to be spent using the transaction card 110), $8 is a fee that goes to the merchant 135, and $5 is a fee that goes to the payment service 140, and $2 is a fee that goes to the financial institution(s) 160. These are exemplary costs and fees are illustrative. In reality, fees may be charged by none of, one of, or multiple of the merchant 135, the payment service 140, and/or the financial institution(s) 160. State and/or federal taxes may also be charged in some cases. In some cases, the cost of the transaction card 110 entirely becomes the balance, with no fees going to the merchant 135, payment service 140, or financial institution(s) 160, or with fees paid to one or two of those entities being subsidized by the third of those entities. If any fees are taken, these may be predetermined constant values regardless of the balance, predetermined fractions/percentages of the balance, or a combination thereof (e.g., a step-like function with predetermined tiered fee values).

In any case, the merchant POS device 130 is able to determine the starting numerical balance of the transaction card 110 (in step 605 of FIG. 6), and this value may also be sent to the payment service 140 (in step 610 of FIG. 6) and optionally to the financial institution(s) 160. In some cases, the first card identifier and/or balance is sent by the merchant POS device 130 to the financial institution(s) 160 which then convey the first card identifier and/or balance to the payment service 140 because the payment service 140 is an underwriting entity. In other cases, the first card identifier and/or balance is sent by the merchant POS device 130 directly to the payment service 140, which in turn may then convey the first card identifier and/or balance to the financial institution(s) 160 if any funds need to be transferred between one or more financial account(s) 170 associated with the customer 125 and one or more financial account(s) 175 associated with merchant 135.

Figure 5:
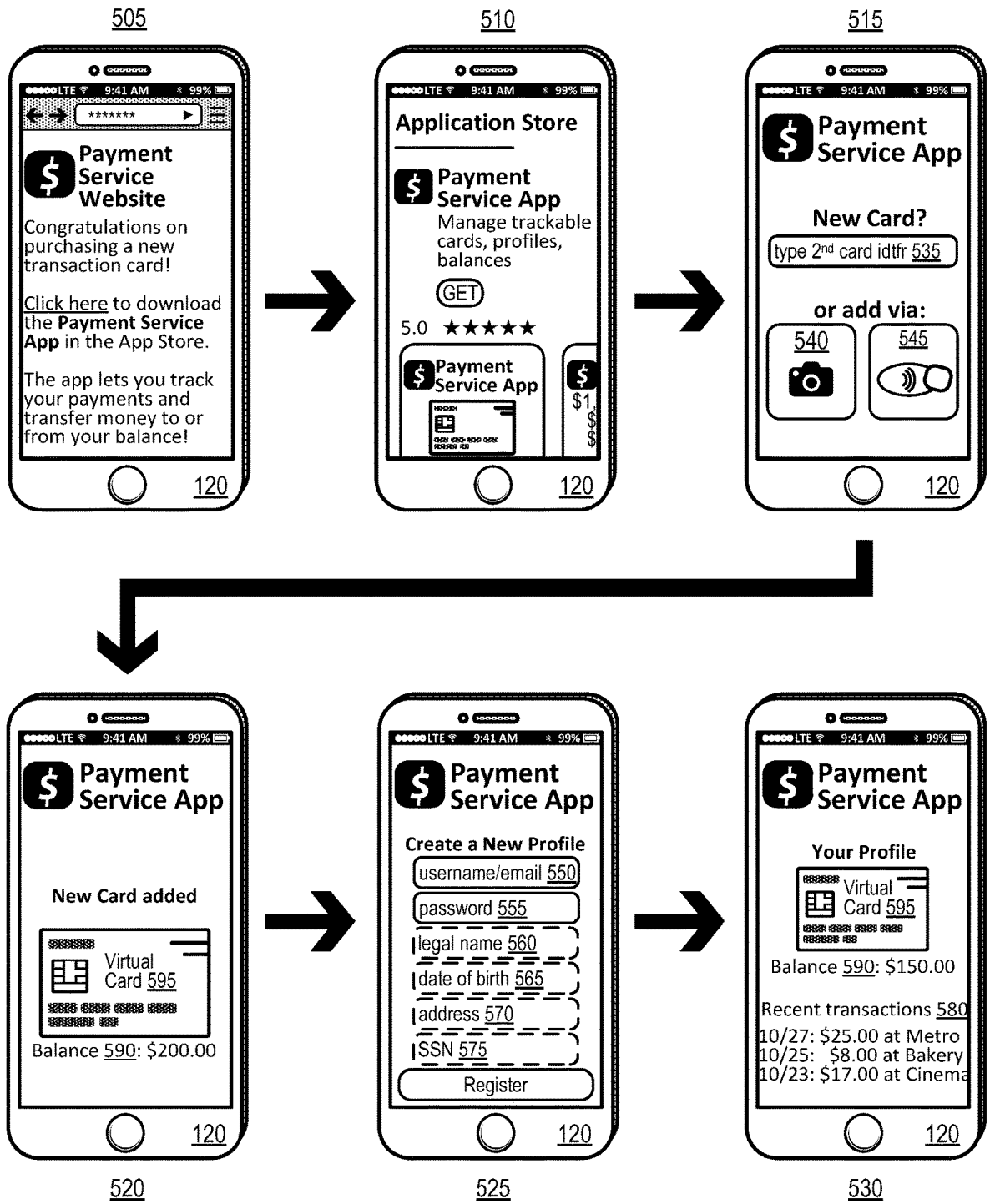
FIG. 5 is a flow diagram illustrating a number of user interfaces of a consumer mobile device at different stages of onboarding a new card and generating a profile tied to the new card.
Figure 6:
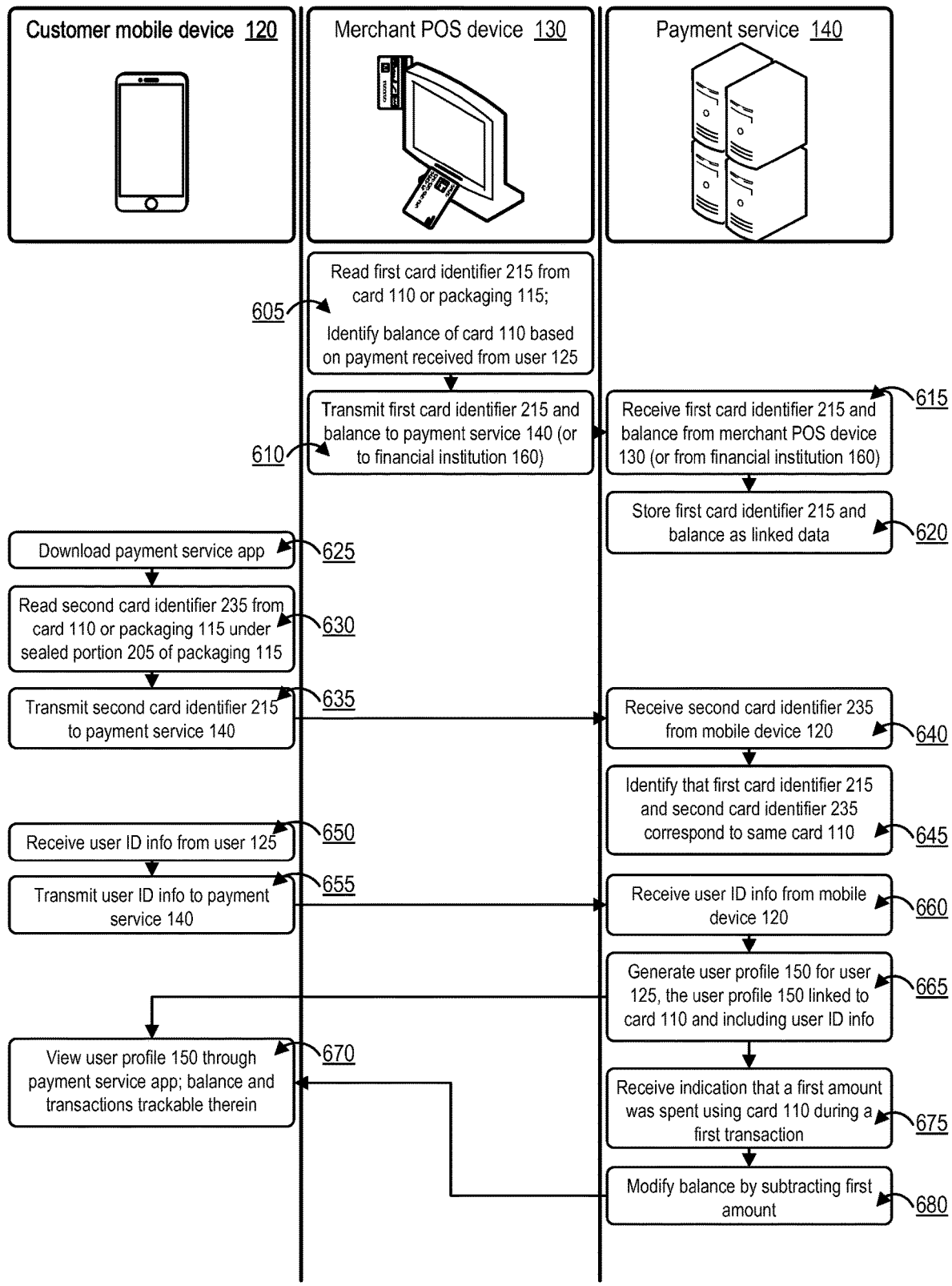
FIG. 6 is a swim lane flow diagram illustrating operations undertaken at various devices illustrated in the system architecture of FIG. 1, including the user mobile device, merchant point of sale (POS) device, and one or more network servers of the payment service.

The system architecture of FIG. 1 is used to onboard the customer 125 onto the payment service 140 so that the payment service 140 can generate a customer profile 150 corresponding to the customer 125 (in step 665 of FIG. 6). The payment service 140 may in some cases generate the customer profile 150 corresponding to the customer 125 before the customer 125 purchases the trackable card 110. Alternately, the payment service 140 may generate the customer profile 150 corresponding to the customer 125 after the customer 125 purchases the trackable card 110, as in the flows illustrated and described in further detail in FIG. 5, FIG. 6, and FIG. 7. Either way, the payment service 140 may link the transaction card 110 to the customer profile 150 of the customer 125 after the customer 125 demonstrates that the card is in his/her possession by receiving a second card identifier at the mobile device 120 (in step 630 of FIG. 6), which the mobile device 120 then sends to the payment service 140 (in steps 635 and 640 of FIG. 6) to confirm that the customer 125 has possession of the transaction card 110 corresponding to that second card identifier. For example, the customer 125 can receive the second card identifier by using a camera of the mobile device 120 to scan an optical glyph on the card 110 and/or the packaging 115 as in FIG. 3A, by using a camera of the mobile device 120 to scan one or both surfaces of the card 110 itself as in FIG. 3B, by using a camera of the mobile device 120 to scan one or more surfaces of the packaging 115, by using a passive or active wireless transceiver of the mobile device 120 to receive data wirelessly from a passive or active wireless transceiver of the card 110 as in FIG. 4A, by using a passive or active wireless transceiver of the mobile device 120 to receive data wirelessly from a passive or active wireless transceiver of the packaging 115 as in 4B, or a combination thereof. This second card identifier may be the same card identifier as the first card identifier that the merchant POS device 130 receives and sends to the payment service 140 and/or to the financial institution(s) 160 during purchase of the transaction card 110 by the customer 125 from the merchant 135, or it may be a different card identifier, which may nonetheless be unique between different transaction cards.

For example, the mobile device 120 may visually scan an optical glyph such as a quick response (QR) code or barcode on the card 110 and/or on the packaging, the optical glyph encoding the second card identifier. The mobile device 120 may alternately or additionally receive the second card identifier from a passive or active short-range wireless transmitter/transceiver/tag/circuitry, such as a passive or active near field communication (NFC) transmitter/transceiver/tag/circuitry, or a transmitter/transceiver/tag/circuitry of any of the types described with respect to the transmitters and transceivers of the output devices 850 of FIG. 8. This second card identifier may be a card number such as a credit card number or debit card number, a card security identifier such as a card expiration date, card verification value (CVV), or card verification code (CVC), or it may be an identifier other than a card number and/or a card security identifier, such as an identifier specific to an optical glyph or NFC tag within the packaging 115 and/or 110.

In some cases, the process described above of receiving the second card identifier from the card 110 and/or packaging 115 by the mobile device 120 and sending the second card identifier from the mobile device 120 to the payment service 140 may instead be performed by the merchant POS device 130, so that the merchant POS device 130 receives the second card identifier from the card 110 and/or packaging 115 and sends the second card identifier to the payment service 140. In some cases, the mobile device 120 may receive the second card identifier as above, then may send the second card identifier to the merchant POS device 130, and either or both devices can send the second card identifier to the payment service 140. Similarly, the merchant POS device 130 may receive the second card identifier, then may send the second card identifier to the mobile device 120, and either or both devices can send the second card identifier to the payment service 140.

One or both of the first card identifier and the second card identifier can be referred to simply as "the card identifier." For instance, if the first card identifier and the second card identifier are the same, The customer 125 can input user identifying information (as in step 650 of FIG. 6) that is transmitted to the payment service 140 (as in steps 655 and 660 of FIG. 6) and then also becomes part of the customer profile 150 of the customer 125 (as in step 665 of FIG. 6), either into the mobile device 120 or into the into the merchant POS device 130. Either way, the device into which the user identifying information is input sends the user identifying information to the payment service 140. The customer 125 may input user identifying information either before or after purchase of the transaction card 110 and either before or after the payment service 140 receives the second card identifier from the mobile device 120 or merchant POS device 130. The user identifying information may include, but is not limited to the customer 125's email address, username, password, residence or mailing address, legal name, social security number (SSN) or other government-issued identification number/code, date of birth (DOB), or a combination thereof, as shown in interface 525 of FIG. 5. In some cases, certain types of information might only be requested for the customer 125 to provide in certain situations. For example, legal name, address, DOB, and/or SSN might only be required if and when the customer 125 makes a purchase or other transaction using the transaction card 110, or when a value of such a purchase or transaction using the transaction 110 exceeds a predetermined value, or when the customer 125 attempts to transfer funds from an account associated with the transaction card 110 to a different financial account.

The trackable card 110 is trackable by the customer via a software application running on the customer mobile device 120 and/or via a website viewable through the customer mobile device 120 (as in interface 530 of FIG. 5 and/or steps 675, 680, and 670 of FIG. 6). The payment service, as underwriting entity for the transaction card 110, receives notifications from merchant POS device 130 and/or financial institution(s) 160 whenever the transaction card 110 is used in a transaction. The payment service 140 interprets this transaction information, which often uses difficult-to-understand codes, into plain English, optionally converts currencies as appropriate, optionally formats the transactions into an easy-to-read format, and presents this interpreted and/or converted and/or formatted transaction information to the customer 125 via the mobile device 120 via the software application or website. In the same way, the payment service 140 may track the numerical balance remaining associated with the transaction card 110, and may update the numerical balance in real-time as it is modified following transactions made using the transaction card 110.

The customer 125 in FIG. 1 may also be referred to as the user 125. Similarly, the customer mobile device 120 may be referred to as the user mobile device 120, and the customer profile(s) 150 may be referred to as user profile(s) 150.

Figure 2A:
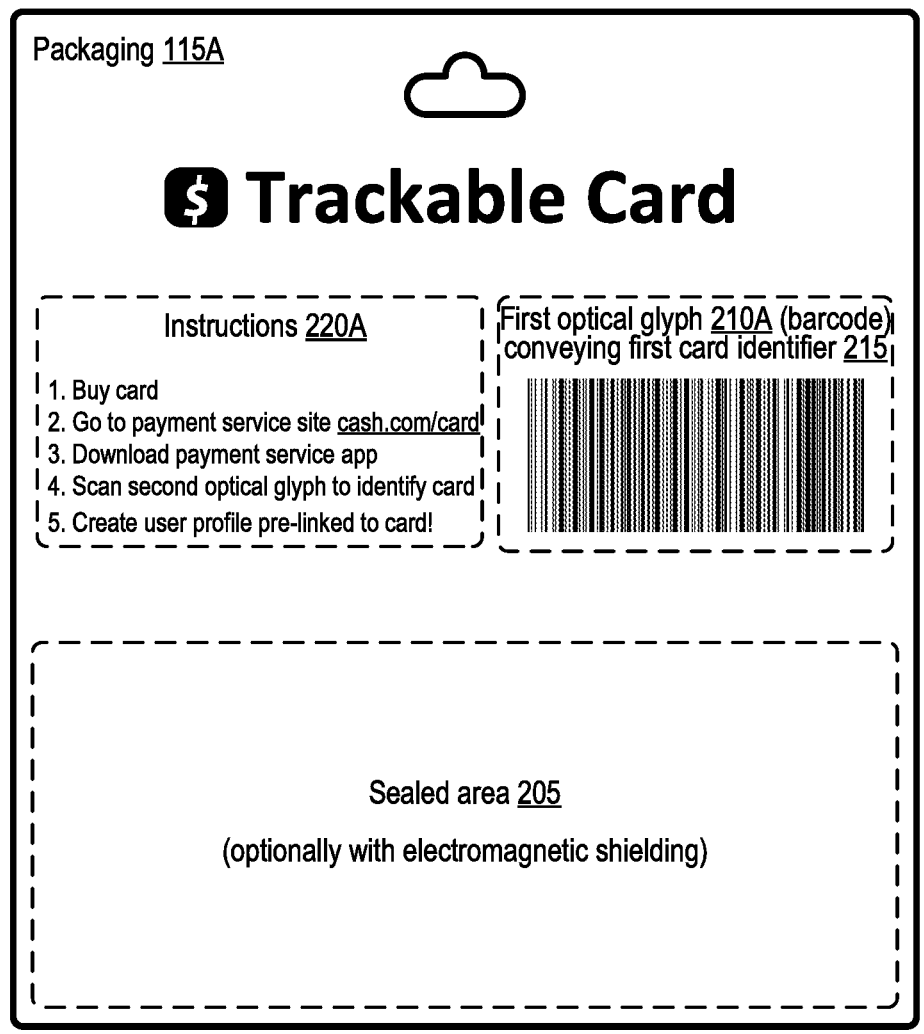
FIG. 2A illustrates packaging for a trackable transaction card, the packaging including an optical glyph conveying a first card identifier and a sealed area holding at least the trackable transaction card, optionally via electromagnetic shielding.

FIG. 2A illustrates packaging for a trackable transaction card, the packaging including an optical glyph conveying a first card identifier and a sealed area holding at least the trackable transaction card, optionally via electromagnetic shielding.

In particular, the exemplary packaging 115A of FIG. 2A includes a first optical glyph 210A in the form of a barcode, the first optical glyph 210A scanned by the merchant POS device 130 to receive the first card identifier at step 605 of FIG. 6. The barcode-style optical glyph 210A of FIG. 1A may be scanned by the merchant POA device 130 during purchase of the transaction card 110 as discussed with respect to FIG. 1, FIG. 6, and FIG. 7. The scanning of the barcode-style optical glyph 210A of FIG. 1A by the merchant POA device 130 may use a camera of the merchant POA device 130 similar to the scanning of the second optical glyph 230B of FIG. 3A using the camera of the mobile device 120.

The packaging 115A also includes instructions 220A, which direct the user 125 to buy the card 110, go to a website associated with the payment service 140 (cash.com/card), download a software application associated with the payment service 140 (payment service app), scan a second optical glyph 230 (not shown in FIG. 2A) to identify the card via a second card identifier 235, and create a user profile with the payment service 140 where the user profile is pre-linked to the card 110.

Figure 2B:
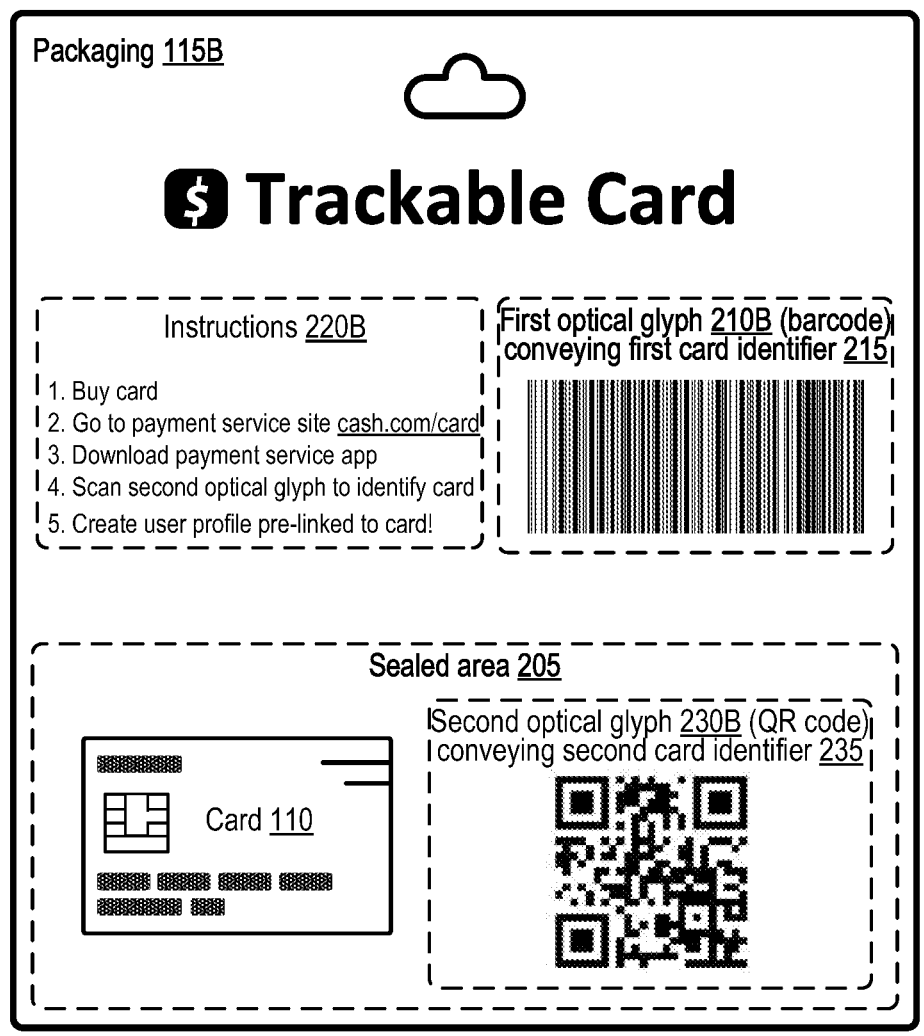
FIG. 2B illustrates the packaging of FIG. 2A with the sealed area uncovered, the sealed area including at least the trackable transaction card and a second optical glyph conveying a second card identifier.
Figure 2C:
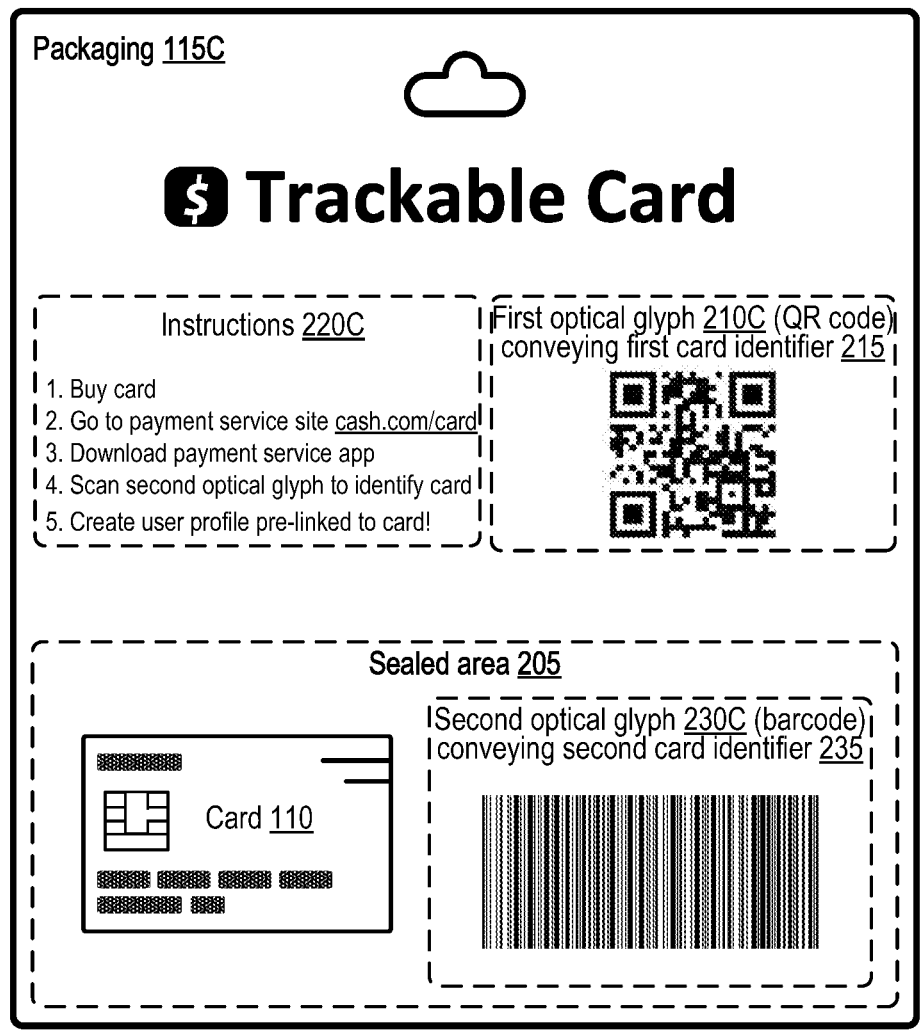
FIG. 2C illustrates packaging similar to that of FIG. 2B, except the first optical glyph is a quick response (QR) code and the second optical glyph is a barcode.
Figure 2D:
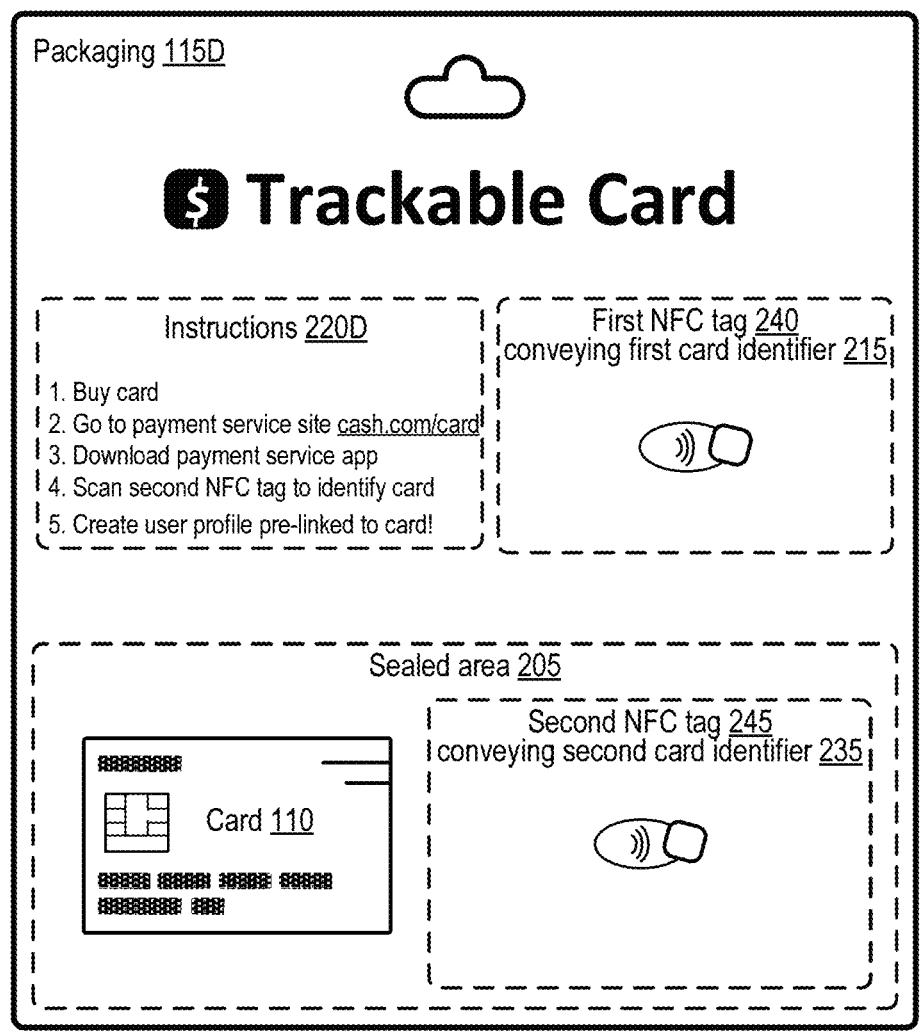
FIG. 2D illustrates packaging similar to that of FIG. 2B, except the first optical glyph and the second optical glyph are both replaced by near field communication (NFC) tags.

The exemplary packaging 115A of FIG. 2A also includes a sealed area 205, which may cover or at least partially cover/obstruct/shield/enclose/protect the transaction card 110, a second optical glyph 230 conveying the second card identifier 235 as illustrated in FIG. 2B and FIG. 2C, a second NFC tag 245 conveying the second card identifier 235 as illustrated in FIG. 2D, or some combination thereof. The sealed area 205 may be sealed at least in part using materials having electromagnetic shielding properties, such as conductive or magnetic materials, to guard against incoming or outgoing emissions of electromagnetic frequencies or electromagnetic interference, and more specifically to prevent a malicious party from retrieving the second card identifier 235 from the second NFC tag 245 or from the card 110 itself, and to prevent a malicious party from reading, writing to, or otherwise accessing the card 110 itself without opening the sealed area 205. If the card 110 is already preloaded with a particular balance and does not need activation, this helps prevent a malicious party from stealing funds from a balance of the card. Such shielding can be used to prevent or reduce the passage of near field communication (NFC) and/or radio frequency identification (RFID) signals that might be used by the transaction card 110 and/or a short-range wireless transceiver component 245 of the packaging 115 for payments/transactions and/or to convey the second card identifier 235, for example. Electromagnetic shielding materials may include ferromagnetic metals, ceramic magnets, rare earth magnets, ferrite magnets, or combinations thereof. Electromagnetic shielding may be comprised of sheets, foils, screens, meshes, foams, or combinations thereof. Materials that may be used may include but are not limited to copper, nickel, iron, permalloy, mu-metal, neodymium, boron, samarium, steel, gold, cobalt, aluminum, iron oxide, barium, strontium carbonate, or alloys or combinations thereof. The sealed area 205 may act as a Faraday cage or Faraday shield.

FIG. 2B illustrates the packaging of FIG. 2A with the sealed area uncovered, the sealed area including at least the trackable transaction card and a second optical glyph conveying a second card identifier.

The exemplary packaging 115B of FIG. 2B is identical to the packaging 115A of FIG. 2A, but the sealed area 205 is uncovered and revealed. The sealed area 205 in FIG. 2B includes the card 110, which is shown with an integrated circuit (IC) chip on its front surface, the IC chip optionally being an Europay/Mastercard/Visa (EMV) chop following EMV standards. The card 110 may alternately or additionally include a magnetic stripe on its rear surface (not shown) and/or integrated active or passive NFC circuitry.

The sealed area 205 in FIG. 2B also includes a second optical glyph 230B that conveys the second card identifier 235 to the mobile device 120 as in step 630 of FIG. 6 (or alternately to the merchant POS device 130), the second optical glyph 230B taking the form of a quick response (QR) code that encode the second card identifier 235.

The instructions 220B and first optical glyph 210B of FIG. 2B are the same as the instructions 220A and first optical glyph 210A of FIG. 2A.

FIG. 2C illustrates packaging similar to that of FIG. 2B, except the first optical glyph is a quick response (QR) code and the second optical glyph is a barcode.

The exemplary packaging 115C of FIG. 2C is similar to the packaging 115B of FIG. 2B, but the first optical glyph 210C is a QR code encoding the first card identifier 215 rather than a barcode encoding the first card identifier 215, and the second optical glyph 230C is a barcode encoding the second card identifier 235 rather than a QR code encoding the second card identifier 235. The instructions 220C of FIG. 2C are the same as the instructions 220A and 220B of FIG. 2A and FIG. 2B.

FIG. 2D illustrates packaging similar to that of FIG. 2B, except the first optical glyph and the second optical glyph are both replaced by near field communication (NFC) tags.

The exemplary packaging 115D of FIG. 2D is similar to the packaging 115B of FIG. 2B, but the first optical glyph 210B is replaced with a first NFC tag 240 conveying the first card identifier 215, and the second optical glyph 230B is replaced with a second NFC tag 245 conveying the second card identifier 235.

It should be understood that the packaging 115 of FIGS. 2A-2D are exemplary and not intended to be limiting. Packaging can, in reality, include any variation of the possible variations of the first optical glyph 210 (barcode, QR code), any variation of the possible variations of the second optical glyph 230 (barcode, QR code), the first NFC tag 240, and/or the second NFC tag 245. Any of these may be supplemented and/or replaced and/or missing entirely.

Figure 3A:
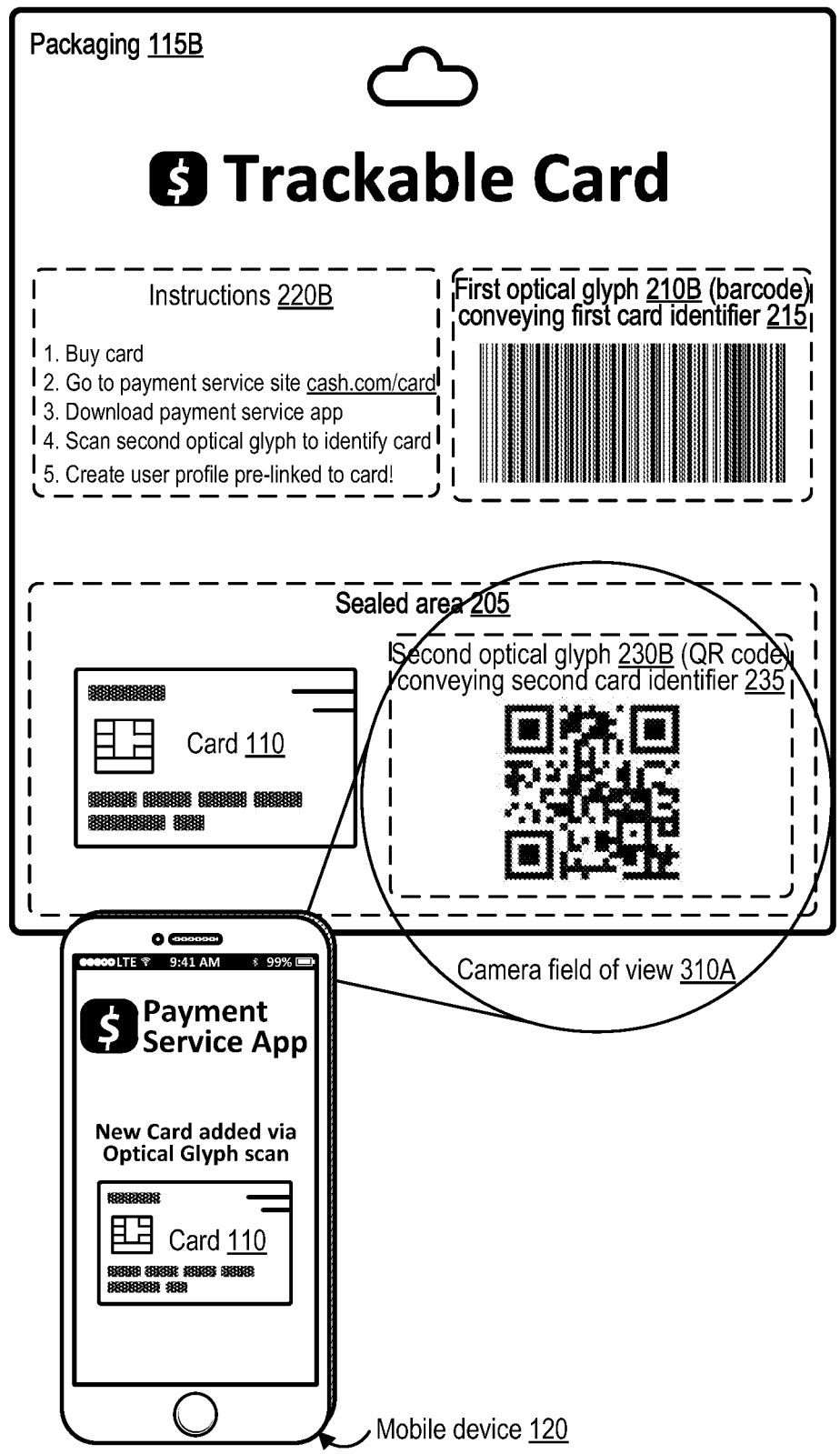
FIG. 3A illustrates a mobile device using an optical sensor to scan the second optical glyph of the packaging of FIG. 2B, the second optical glyph in the form of a quick response (QR) code and conveying the second card identifier identifying the trackable transaction card.

FIG. 3A illustrates a mobile device using an optical sensor to scan the second optical glyph of the packaging of FIG. 2B, the second optical glyph in the form of a quick response (QR) code and conveying the second card identifier identifying the trackable transaction card.

In particular, a camera of the mobile device 120 is pointed in a direction facing the second optical glyph 230B (i.e., the QR code) within the sealed area 205 of the packaging 115 of FIG. 3A. A camera field of view 310A of the camera is illustrated as including the entirety of the second optical glyph 230B, but in some cases only a portion of the second optical glyph 230B is enough for the second card identifier 235 to be readable by the mobile device 120.

While the mobile device 120 of FIG. 3A is scanning the second optical glyph 230B, it should be understood that the same technique can be used to scan the first optical glyph 210B. Furthermore, the same technique can be used to scan barcodes as QR codes.

While the mobile device 120 of FIG. 3A uses a camera to scan the first optical glyph 210B and/or second optical glyph 230B, it should be understood that one or more different types of optical sensor(s) can be used to scan the first optical glyph 210B and/or second optical glyph 230B instead of or in addition to the camera. For instance, the mobile device 120 can use a linear laser-based scanner, an omnidirectional starburst-shaped laser-based scanner, an omnidirectional Lissajous pattern laser-based scanner, a light emitting diode (LED) based scanner, a charge-coupled device (CCD) scanner, a still image camera, a video camera, or some combination thereof.

While a mobile device 120 is used in FIG. 3A to scan the first optical glyph 210B and/or second optical glyph 230B, it should be understood that the merchant POS device 130 can be used in place of the mobile device 120 to scan the first optical glyph 210B and/or second optical glyph 230B with the camera and/or any of the other types of optical sensor(s) discussed above.

Figure 3B:
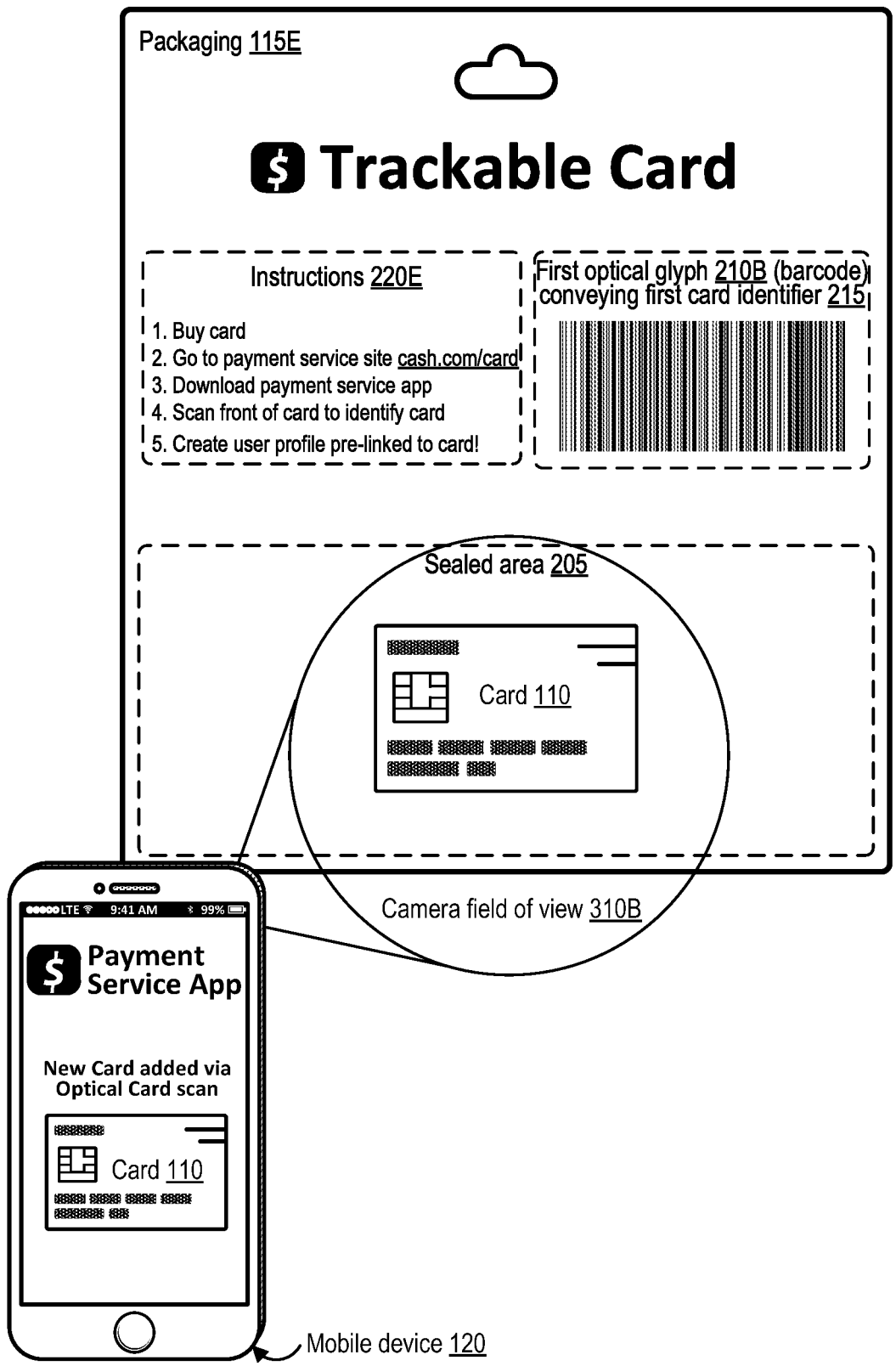
FIG. 3B illustrates a mobile device using an optical sensor to scan at least a front surface of a trackable transaction card, thereby reading the second card identifier from the surface of the trackable transaction card.

FIG. 3B illustrates a mobile device using an optical sensor to scan at least one surface of a trackable transaction card, thereby reading the second card identifier from the surface of the trackable transaction card.

The camera field of view 310B in FIG. 3B includes a front surface of the card 110. In this context, the mobile device 120 is reading at least a portion of the second card identifier 235 from the front surface of the card 110. For example, the card number and/or the expiration date of the card may make up at least a portion of the second card identifier 235. While the entire front surface of the card 110 is in the camera field of view 310B as illustrated in FIG. 3B, it may be possible for the mobile device 120 to read all information necessary for the second card identifier 235 from the front surface of the card 110 even if only a portion of the front surface of the card 110 is in the camera field of view 310B, such as a portion including the card number and/or expiration date. The mobile device 120 may alternatively or additionally scan a rear surface of the card 110 as in FIG. 3C.

Figure 3C:
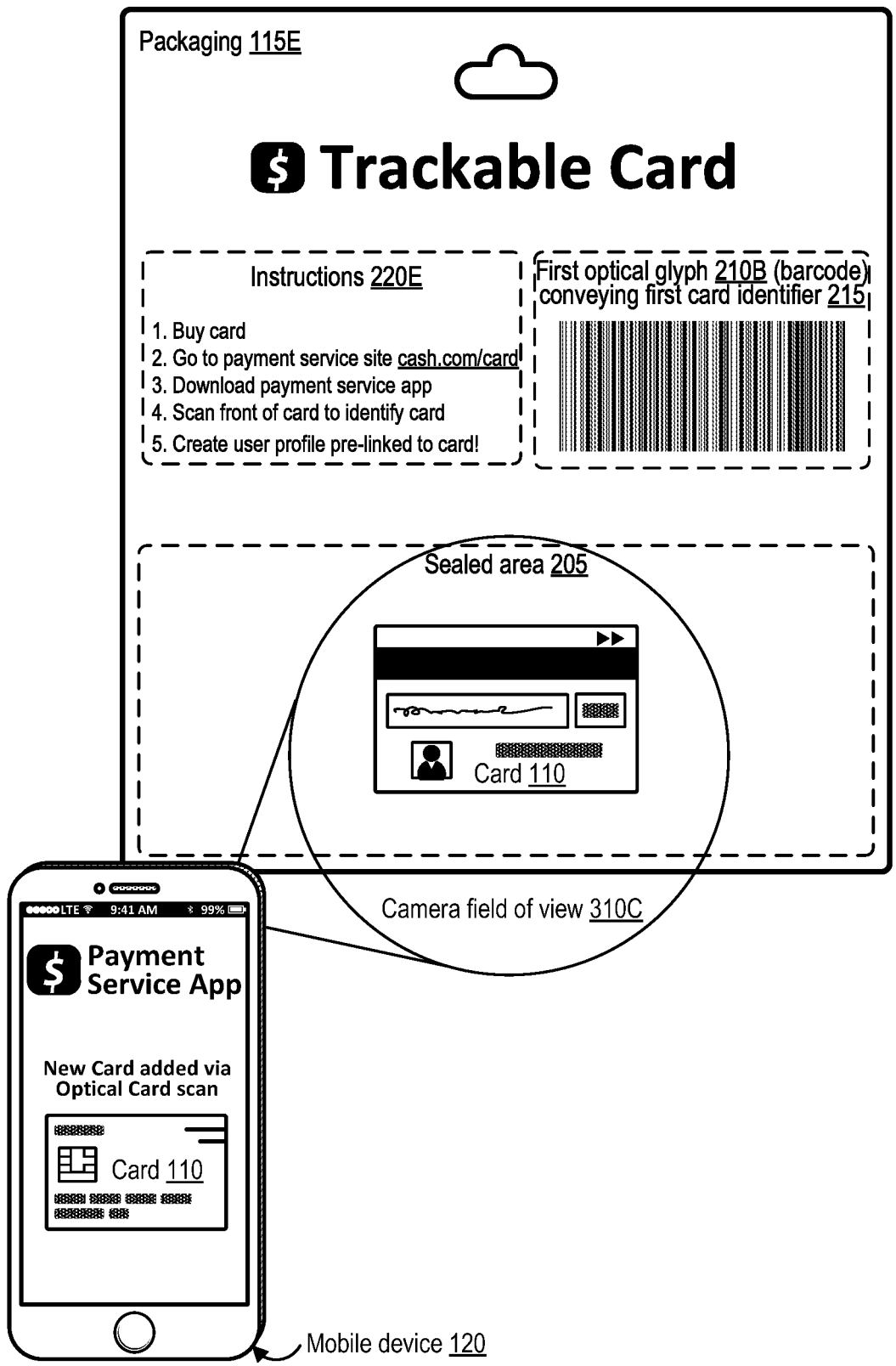
FIG. 3C illustrates a mobile device using an optical sensor to scan at least a rear surface of a trackable transaction card, thereby reading the second card identifier from the surface of the trackable transaction card.

The packaging 115E in FIG. 3B and FIG. 3C does not include a second optical glyph 230, but it should be understood that it may also include the second optical glyph 230, which may for example provide another component of the second card identifier 235.

FIG. 3C illustrates a mobile device using an optical sensor to scan at least a rear surface of a trackable transaction card, thereby reading the second card identifier from the surface of the trackable transaction card.

The camera field of view 310B in FIG. 3C includes the rear surface of the card 110. In this context, the mobile device 120 is reading at least a portion of the second card identifier 235 from the front surface of the card 110. For example, the signature of the user 125 and/or the CVC or CVV of the card may make up at least a portion of the second card identifier 235. While the entire rear surface of the card 110 is in the camera field of view 310C as illustrated in FIG. 3C, it may be possible for the mobile device 120 to read all information necessary for the second card identifier 235 from the rear surface of the card 110 even if only a portion of the rear surface of the card 110 is in the camera field of view 310C, such as a portion including the signature or the CVC/CVV. The mobile device 120 may alternatively or additionally scan a front surface of the card 110 as in FIG. 3B. In some cases, the mobile device 120 must scan both the front surface (as in FIG. 3B) and the rear surface (as in FIG. 3C) and optionally other items (such as the second optical glyph 230 and/or the first optical glyph 210 of FIG. 3A) to have all of the information necessary to generate the second card identifier 235.

While FIG. 3A, FIG. 3B, and FIG. 3C illustrate the mobile device 120 performing scanning of information from the packaging 115 and/or from the card 110, it should be understood that the same methods may be employed by the merchant POS device 130 to retrieve either or both of the first card identifier 115 (as in step 605 of FIG. 6) and/or the second card identifier 135 (as in step 630 of FIG. 6, which would in such a case be moved into the merchant POS device column along with step 635). Furthermore, while a camera is discussed as being used for the scanning of the first card identifier 115 and/or second card identifier 135, any of the alternate optical sensor types discussed with respect FIG. 3A may be used by the mobile device 120 and/or the merchant POS device 130 instead of or in addition to the camera.

Figure 4A:
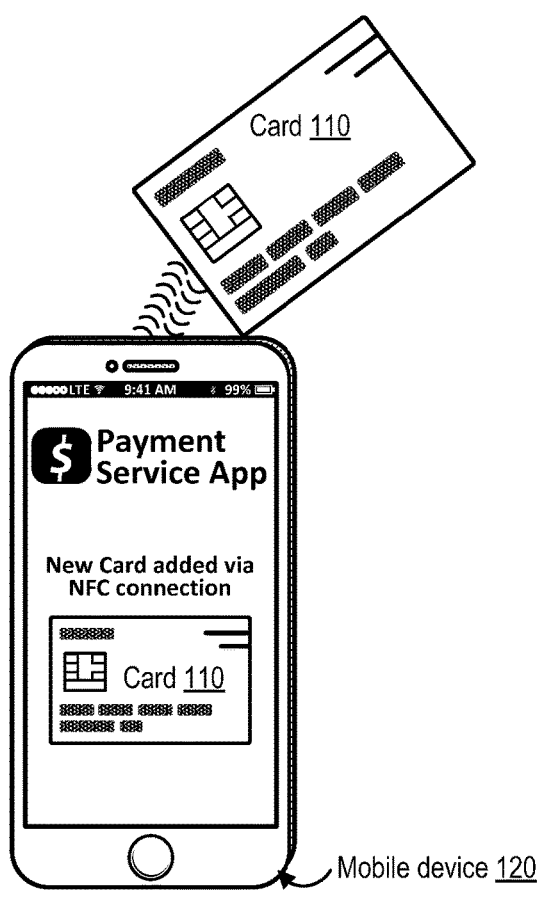
FIG. 4A illustrates a mobile device receiving information about a trackable transaction card from near field communication (NFC) circuitry of the trackable transaction card via NFC circuitry of the mobile device.

FIG. 4A illustrates a mobile device receiving information about a trackable transaction card from near field communication (NFC) circuitry of the trackable transaction card via NFC circuitry of the mobile device.

The transaction card 110 of FIG. 4A includes NFC circuitry that communicates with NFC circuitry of the mobile device 120. In particular, the NFC circuitry of the transaction card 110 may be a passive NFC tag without its own power supply while the mobile device 120 may include an active NFC transceiver connected to the mobile device 120's power supply (e.g., a battery or a wall outlet), in which case the active NFC transceiver of the mobile device 120 generates an electromagnetic field by the mobile device 120 driving an antenna of the active NFC transceiver, providing the passive NFC tag of the card 110 with power, allowing the passive NFC tag to conveying at least a portion of the second card identifier 135 to the mobile device 120, for example via modulations of the field generated by the active NFC transceiver. Alternately, the card 110 may include an active NFC transceiver and a small power supply, and may generate and modulate a field of its own through which it may communicate with a passive or active NFC transceiver of the mobile device 120. The NFC circuitry of the card 110 may alternately or additionally convey at least a portion of the first card identifier 115.

Figure 4B:
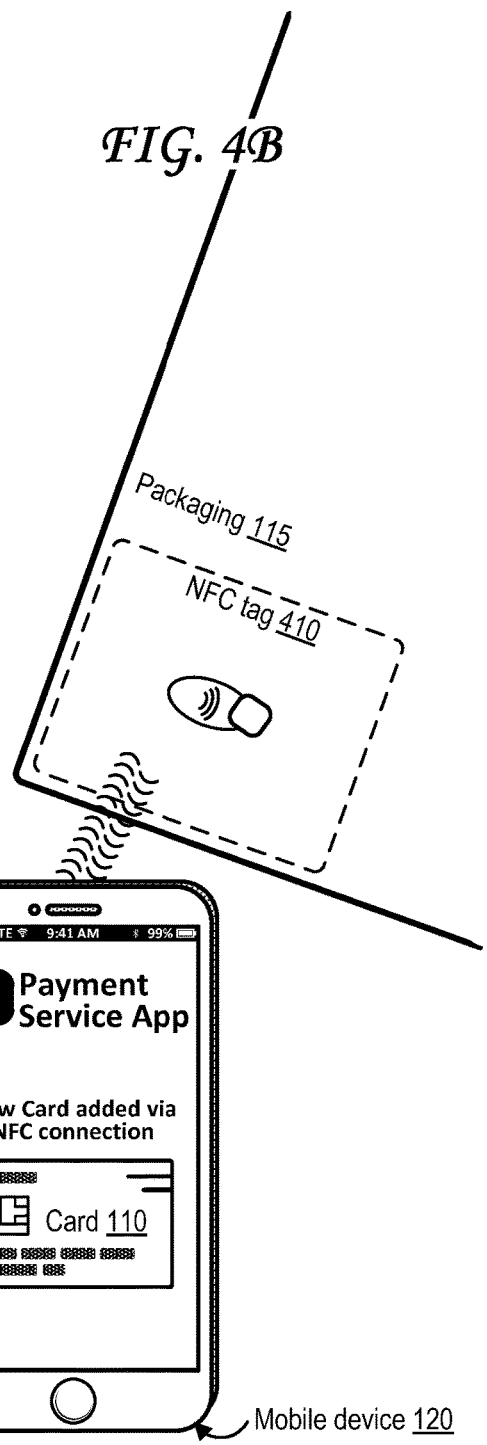
FIG. 4B illustrates a mobile device receiving information about a trackable transaction card from near field communication (NFC) circuitry of packaging of the trackable transaction card via NFC circuitry of the mobile device.

FIG. 4B illustrates a mobile device receiving information about a trackable transaction card from near field communication (NFC) circuitry of packaging of the trackable transaction card via NFC circuitry of the mobile device.

In particular, FIG. 4B illustrates the mobile device 120 communicating via NFC with an NFC tag 410, which may be either the first NFC tag 240 of FIG. 2D, the second NFC tag 245 of FIG. 2D, or some combination thereof. The NFC tag 410 may convey to the mobile device 120 at least a portion of the first card identifier 115, at least a portion of the second card identifier 135, or some combination thereof, and may include any type of NFC circuitry discussed with respect to the NFC circuitry of the card 110 in FIG. 4A.

While FIG. 4A and FIG. 4B illustrate the mobile device 120 receiving at least a portion of the first card identifier 115 and/or at least a portion of the second card identifier 135 from at least one of NFC circuitry in the card 110 (as in FIG. 4A) and/or from one or more NFC tags 410 in the packaging 115 (as in FIG. 4B), it should be understood that the merchant POS device 130 may receive at least a portion of the first card identifier 115 and/or at least a portion of the second card identifier 135 from at least one of NFC circuitry in the card 110 (as in FIG. 4A) and/or from one or more NFC tags 410 in the packaging 115 (as in FIG. 4B) in the same way.

Furthermore, while FIG. 4A and FIG. 4B discuss short-range wireless communication via NFC, it should be understood that other types of short-range wireless communication may be used instead or additionally, including circuitry of any of the types described with respect to the transmitters and transceivers of the output devices 850 of FIG. 8 (including but not limited to Bluetooth® or Bluetooth Low Energy®).

FIG. 5 is a flow diagram illustrating a number of user interfaces of a consumer mobile device at different stages of onboarding a new card and generating a profile tied to the new card.

A first user interface 505 of the mobile device 120 of FIG. 5 is a user interface of a website associated with the payment service 140, which the instructions 220 on the packaging 115 instruct the user 125 to go to using the mobile device 120. The website interface 505 congratulates the user on purchasing the new transaction card 110 and directs the user 120 to download a software application associated with the payment service 140 onto the mobile device 120, for example by providing a link to an application store interface 510 such as the Apple® App Store® or the Google® Play Store® or the Amazon® Appstore®, from which the software application may be downloaded. The application store interface 510 is the second user interface 510 in FIG. 5.

The third user interface 515 in FIG. 5 is a user interface of the software application associated with the payment service 140. The interface 515 is one through which the second card identifier 235 may be conveyed to the mobile device 120 by the user 125 typing the second card identifier 235 (or some portion thereof) into an input field 530 through a physical keyboard/keypad, virtual touchscreen keyboard/keypad, or other input device 860. The interface 515 also allows the user 125 to trigger initiation of a camera or other optical sensor of the mobile device 120 via button 540 to visually scan an optical glyph 210/230 and/or at least one surface of the card 110 as discussed with respect to FIGS. 3A-3C and thereby read the second card identifier 235 (or some portion thereof) encoded or simply written therein. The interface 515 also allows the user 125 to trigger initiation of NFC circuitry of mobile device 120 via button 545 to thereby allow the mobile device 120 to receive the second card identifier 235 (or some portion thereof) from NFC circuitry of the card 110 and/or from NFC circuitry of the packaging 115.

Note that while some of FIGS. 2B-2D, 3A-3C, 4A-4B, and 5 (and the descriptions thereof) may indicate or suggest that the entire second card identifier 235 is conveyed via the second optical glyph 230 on the packaging 115, the front surface of the card 110, the rear surface of the card 110, a second NFC tag 245 in the packaging 115, an NFC tag/circuitry in/on the card 110, and a typed in code 530 or card number 530, in reality the second card identifier 235 may be conveyed in part by multiple of these components, for example by arranging one or more of these in order and then encrypting them with an encryption key, where the payment service 140 has the corresponding decryption key. The encryption key and decryption key may be symmetric or asymmetric, and either or both may be capable of both encrypting and decrypting content. The first card identifier 215 can be encoded similarly, with portions optionally conveyed via the first optical glyph 210 on the packaging 115, the front surface of the card 110, the rear surface of the card 110, a first NFC tag 240 in the packaging 115, an NFC tag/circuitry in/on the card 110, and a typed in code 530 or card number 530, or combinations thereof, optionally also encrypted via the encryption key to be decrypted by the decryption key at the payment service 140.

Once the mobile device 120 receives the second card identifier 235 via interface 515, the mobile device 120 sends the second card identifier 235 to the payment service 140. The mobile device 120 receives confirmation from the payment service 140 that the second card identifier 235 was received, and the payment service 140 may then identify that the second card identifier 235 matches the first card identifier 215 that it received earlier from the merchant POS device 130, and may thereby retrieve the balance 590 of the card 110. A fourth user interface 520 in FIG. 5 is illustrated confirming that the new card 110 has been added, for example by displaying a virtual card 595 representation of the new card 110, optionally also displaying the balance 590, which in the fourth user interface 520 in FIG. 5 is $200.00. Display of the fourth user interface 520 may be triggered by sending the second card identifier 235 to the payment service 140, by receiving confirmation from the payment service 140 of receipt of the second card identifier 235, or by receiving confirmation from the payment service 140 that the payment service 140 has located the first card identifier 215 that matches with the second card identifier 235.

Note that a similar process to that discussed with respect to interfaces 515 and 520 may be used by the merchant POS device 135 if it is used in place of the mobile device 120 in reading/scanning/receiving the second card identifier 235 and transmitting it to the payment service 140. A similar process to that discussed with respect to interfaces 515 and 520 may also be used by the merchant POS device 135 in in reading/scanning/receiving the first card identifier 215 and transmitting it to the payment service 140 (at steps 605 and 610 of FIG. 6).

A fifth interface 525 in FIG. 5 is illustrated through which the user 125 inputs additional user identifying information that the payment service 140 can then use in the generation of a user profile 150 for the user 125. This information may include a username and/or email address 550, a password 555, a legal name 560, a date of birth (DOB) 565, a residence or mailing address 570, a social security number (SSN) 575 or other government-issued identification number/code, or some combination thereof. In some cases, some of this information may not be required—in some cases, for example, only a username and/or email address 550 and a password 555 are required. Certain information, such as the user 125's legal name 560, a date of birth (DOB) 565, a residence or mailing address 570, a social security number (SSN) 575 or other government-issued identification number/code may be required by financial institution(s) 160 government entities in order for the user 125 to be able to perform certain tasks, and therefore might for example only be required if and when the customer 125 makes a purchase or other transaction using the transaction card 110, or when a value of such a purchase or transaction using the transaction 110 exceeds a predetermined value or percentage/fraction of the balance 590, or when the user 125 attempts to use the card 110 for a transaction for a purchase amount that exceeds the remaining balance 590 and therefore requires credit (e.g., a loan) for the remainder, when the customer 125 attempts to transfer funds (e.g., via wire transfer or check) from an account associated with the transaction card 110 to a different financial account, or when the balance 590 exceeds a predetermined amount, such as a maximum amount that is covered by the Federal Deposit Insurance Corporation (FDIC).

A sixth interface 530 of FIG. 5 is illustrated as an interface through which the user 125 may track the balance 590 of the card 110, which includes a virtual card 595 generated by the payment service and corresponding to the physical card 110 purchased by the user. In this way, the payment service enables instant creation of a virtual card 595 and account linking upon a user purchasing a physical card at a merchant, downloading an application associated with the payment service, and using the mobile application to interface with a identifying element of the physical card 110. As shown here, the account balance has decreased from $200.00 in interface 520 to $150.00 in interface 530. Interface 530 also lists recent transactions 580 made using the card 110, including $25.00 spent at Metro public transit on October 27, $8.00 spent at Bakery on October 25, and $13.00 spent at Cinema on October 23. These recent transactions 580 add up to $50.00 in expenditures, which account for the decrease of the balance 590 from $200.00 to $150.00 between the time at which interface 520 is displayed and the time at which interface 530 is displayed.

While FIG. 5 only displays a single card 110, it should be understood that the processes described herein may be used to link multiple cards 110 to a single user profile 150 of the user 125. Each card of these multiple cards 110 may have a separate balance 590, or multiple cards 110 may draw from the same balance 590. Each card 110 and its balance 590 and transactions 580 may be tracked via the interface 530.

While interfaces 515, 520, 525, and 530 are illustrated and discussed as being interfaces of the software application associated with the payment service 140 (the "payment service app"), it should be understood that interfaces 515, 520, 525, and 530 can instead simply be interfaces of a website associated with the payment service 140 (the "payment service website" of interface 505), in which case interfaces 505 and 510, and the download of the software application associated with the payment service 140 (the "payment service app"), can be removed from the process.

FIG. 6 is a swim lane flow diagram illustrating operations undertaken at various devices illustrated in the system architecture of FIG. 1, including the user mobile device, merchant point of sale (POS) device, and one or more network servers of the payment service.

At step 605, the merchant POS device 130 reads the first card identifier 215 from the transaction card 110 and/or from the packaging 115 using any combination of the methods that the mobile device 120 uses in FIGS. 3A-3C, 4A-4B, and 5 to read the second card identifier 235. Also at step 605, the merchant POS device 130 identifies a balance 590 of the transaction card 110 based on a payment received from the user 125 as discussed in FIG. 1. That is, the balance 590 of the card 110 is the amount paid minus any fees (if there are any) that go to the merchant 135, to the payment service 140, and/or to financial institution(s) 160.

At step 610, the merchant POS device 130 transmits first card identifier 215 and balance 590 to payment service 140, which receives the first card identifier 215 and balance 590 at step 615. While in some cases, the merchant POS device 130 transmits first card identifier 215 and balance 590 to payment service 140 directly, in other cases, the merchant POS device 130 instead (or additionally) transmits at least one of first card identifier 215 and balance 590 to the financial institution(s) 160, which in turn transmit at least one of first card identifier 215 and balance 590 to the payment service 140, which the financial institution(s) 160 may consider an underwriting entity for the card 110.

After receiving the first card identifier 215 and balance 590 at step 615, the payment service 140 stores the first card identifier 215 and balance 590 at step 620, and does so in a way that the first card identifier 215 and balance 590 are linked to or associated with each other. That is, the first card identifier 215 and balance 590 may be stored in the same data structure (e.g., database or spreadsheet or list or array or dictionary) of the payment service 140 in a way that is clear that these are related to each other (e.g., in the same row or column).

At step 625, the user mobile device 120 downloads the software application associated with the payment service 140 (the payment service app) as in interfaces 505, 510, and 515 of FIG. 5. At step 630, the mobile device 120 uses the payment service app to read, input and/or interact with the second card identifier 235 from the transaction card 110 and/or the packaging 115 (e.g., under sealed portion 205 of packaging 115) as illustrated in and discussed with respect to FIGS. 3A-3C, FIGS. 4A-4B, and interface 515 of FIG. 5. At step 635, the mobile device 120 sends the second card identifier 235 to the payment service 140, which receives the second card identifier 235 at step 640.

At step 645, the payment service 140 identifies that the first card identifier 215 that it received at step 615 and the second card identifier 235 that it received at step 640 correspond to same card 110, and optionally stores the second card identifier 235 linked to or associated with the first card identifier 215 and the balance as discussed with respect to step 620. The payment service 140 may recognize that the first card identifier 215 and the second card identifier 235 both correspond to same card 110 because the payment service 140 itself generated both the first card identifier 215 and the second card identifier 235 during or prior to manufacture of the card 110 and/or of the packaging 115, before step 605 ever occurs. This pre-generation of the first card identifier 215 and the second card identifier 235 as pre-linked to the card 110 and/or packaging 115 by the payment service 140 enables instant creation of the user profile preloaded with a virtual card 595 representing the physical card 110 and account balance 590 associated with the physical card.

At step 650, the user mobile device 120 receives user identifying information input into the mobile device 120 by the user. As illustrated in and discussed with respect to interface 525, this user identifying information may include a username and/or email address 550, a password 555, a legal name 560, a date of birth (DOB) 565, a residence or mailing address 570, a social security number (SSN) 575 or other government-issued identification number/code, or some combination thereof. At step 655, the user identifying information is transmitted to the payment service 140, which receives the user identifying information at step 660.

At step 665, the payment service generates a user profile 150 for the user 125, the user profile 150 linked to the particular card 110 already upon generation and including the user identifying information received in step 660. At step 670, the user 125 may view his or her user profile through the user payment service app running on the mobile device 120, and may track the balance 590 of the card and transactions 580 made using the card 110.

At step 675, the payment service may receive an indication from a second merchant POS device of a second merchant (other than the merchant POS device 130 at which the transaction card 110 was purchased) that a first amount was spent using the card 110 during a first transaction at the second merchant POS device of the second merchant. To ensure that the card 110 has enough balance for the purchase, the second merchant POS device may send a balance request to the payment system 140, which may respond with the balance 590 of the card. Alternately, to ensure that the card 110 has enough balance for the purchase without revealing the balance 590, the second merchant POS device may send the first amount (the purchase/sale/transaction amount) to the payment system 140, and the payment system 140 may respond with whether the first amount exceeds the remaining balance (meaning there is not enough balance 590 remaining to pay the first amount) or whether the first amount does not exceed the remaining balance (meaning there is enough balance 590 remaining to pay the first amount). Assuming the first transaction of step 675 occurs, the payment system modifies the balance 590 at step 680 by subtracting at least the first amount (as well as any taxes and/or fees and/or tips if they are not included in the first amount). The user 125 may then, at step 670, track the changes to the balance 590 and transactions 580 by viewing the user profile 150 at the mobile device 120.

At least a subset of steps 625, 630, 635, 650, 655, and/or 670 may alternately be performed at or by the merchant POS device 130 instead of by the mobile device 120. For example, the user 125 or merchant 135 may open the sealed area 205 of the packaging 115 immediately upon purchase while the user 125 is still at the merchant, at which point the merchant POS device 130 may be used for at least a subset of steps 625, 630, 635, 650, for example.

Figure 7:
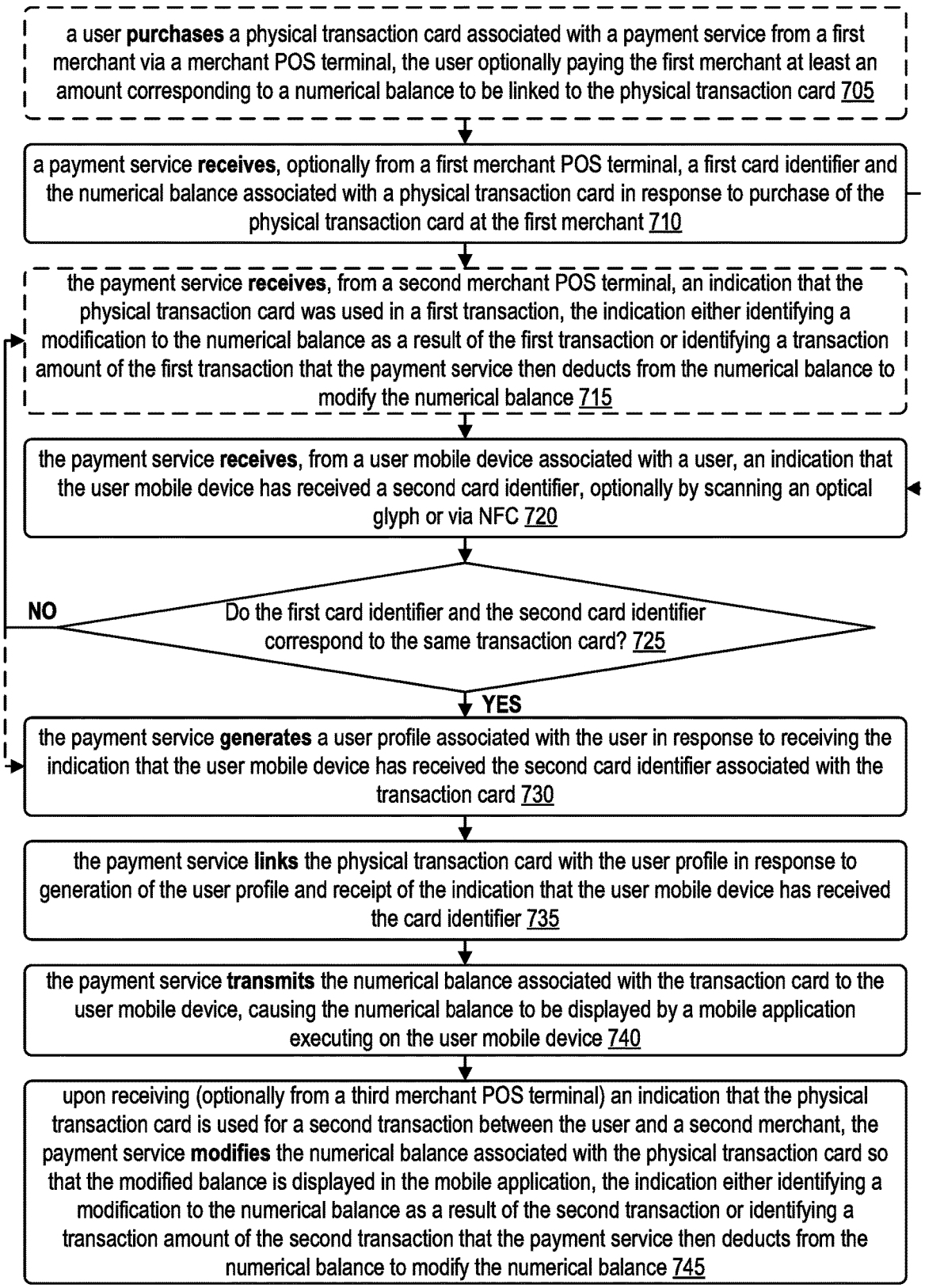
FIG. 7 is a flow diagram illustrating operations undertaken at one or more network servers of a payment service

FIG. 7 is a flow diagram illustrating operations undertaken at one or more network servers of a payment service.

At step 705, a user purchases a physical transaction card associated with a payment service from a first merchant via a merchant POS terminal, the user optionally paying the first merchant at least an amount corresponding to a numerical balance to be linked to the physical transaction card 705. Step 705 is the only step of FIG. 7 that is not performed by the payment service 140, but is included in FIG. 7 for clarity.

At step 710, the payment service 140 receives, optionally from a first merchant POS terminal 130, a card identifier 210 and the numerical balance 590 associated with a physical transaction card 110 in response to purchase of the physical transaction card 110 at the first merchant 135.

At optional step 715, the payment service 140 receives, from a second merchant POS terminal, an indication that the physical transaction card 110 was used in a first transaction, the indication either identifying a modification to the numerical balance 590 as a result of the first transaction or identifying a transaction amount of the first transaction that the payment service then deducts from the numerical balance 590 to modify the numerical balance 590.

At step 720, the payment service 140 receives, from a user mobile device 120 associated with a user 125, an indication that the user mobile device 120 has received a second card identifier 235 associated with the transaction card 110, optionally by scanning an optical glyph or via NFC. The first card identifier 215 and the second card identifier 235 may optionally be the same.

At step 725, the payment service 140 checks to see whether the first card identifier and the second card identifier both correspond to the same card 110. If so, the payment service 140 moves on to steps 730 and 735 to generate a user profile and automatically link that user profile to the card 110. If not, the payment service 140 can in some cases still move on to steps 730 and 735 to generate a user profile and automatically link that user profile to the card 110 matching the second card identifier. However, if no corresponding first card identifier was received from a merchant, this may indicate fraudulent activity, in which case a user profile may be prohibited from being linked to the card 110 in question, and the card 110 itself may be cancelled/banned or may be only usable unlinked to any user profile. This provides an additional security authentication mechanism not present in conventional card onboarding methods.

At step 730, upon receiving the indication that the user has received or otherwise interacted with the second card identifier associated with the transaction card 110, the payment service 140 generates a user profile 150 associated with the user 125. For example, to the payment service may receive an indication that the user has scanned a QR code associated with the transaction card using their mobile device, or that a near field communication (NFC) transceiver of the mobile device obtained an NFC signal from NFC circuitry associated with the physical transaction card. At step 735, the payment service 140 links the physical transaction card with the user profile in response to generation of the user profile and receipt of the indication that the user mobile device has received the card identifier.

At step 740, the payment service 140 transmits the numerical balance 590 associated with the transaction card 110 to the user mobile device 120, causing the numerical balance 590 to be displayed by a mobile application executing on the user mobile device 120.

At step 745, upon receiving (optionally from a third merchant POS terminal) an indication that the physical transaction card is used for a second transaction between the user 125 and a second merchant, the payment service 140 modifies the numerical balance 590 associated with the physical transaction card 110 so that the modified balance 590 is displayed in the mobile application, the indication either identifying a modification to the numerical balance 590 as a result of the second transaction or identifying a transaction amount of the second transaction that the payment service 140 then deducts from the numerical balance 590 to modify the numerical balance 590.

FIG. 8 illustrates an exemplary computing system 800 that may be used to implement some aspects of the subject technology. Any of the computing devices, computing systems, network devices, network systems, servers, and/or arrangements of circuitry described herein (including but not limited to the mobile device 120, the merchant POS device 130, each server of the payment service 140, each server of the one or more financial institutions 160, any circuitry within or on the trackable card 110, and/or any circuitry within or on the packaging 115) may include at least one computing system 800, or may include at least one component of the computer system 800 identified in FIG. 8. The computing system 800 of FIG. 8 includes one or more processors 810 and memory 820. Each of the processor(s) 810 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 810 may include one or more cores, either integrated onto a single chip or spread across multiple chips connected or coupled together. Memory 820 stores, in part, instructions and data for execution by processor 810. Memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing some aspects of the subject technology for purposes of loading that software into memory 820.

Portable storage device 840 operates in conjunction with a portable non-volatile storage medium, such as a floppy disk, compact disk or Digital video disc, to input and output data and code to and from the computer system 800 of FIG. 8. The system software for implementing aspects of the subject technology may be stored on such a portable medium and input to the computer system 800 via the portable storage device 840.

The memory 820, mass storage device 830, or portable storage 840 may in some cases store sensitive information, such as transaction information, health information, or cryptographic keys, and may in some cases encrypt or decrypt such information with the aid of the processor 810. The memory 820, mass storage device 830, or portable storage 840 may in some cases store, at least in part, instructions, executable code, or other data for execution or processing by the processor 810.

Output devices 850 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 870. The printer may be inkjet, laserjet, thermal, or some combination thereof. In some cases, the output device circuitry 850 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 850 may include any ports, plugs, antennae, wired or wireless transmitters, wired or wireless transceivers, or any other components necessary for or usable to implement the communication types listed above, such as cellular Subscriber Identity Module (SIM) cards.

Input devices 860 may include circuitry providing a portion of a user interface. Input devices 860 may include an alpha-numeric keypad, such as a keyboard, for inputting alpha-numeric and other information, or a pointing device, such as a mouse, a trackball, stylus, or cursor direction keys. Input devices 860 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 860 may include any ports, plugs, antennae, wired or wireless receivers, wired or wireless transceivers, or any other components necessary for or usable to implement the communication types listed above, such as cellular SIM cards.

Input devices 860 may include receivers or transceivers used for positioning of the computing system 800 as well. These may include any of the wired or wireless signal receivers or transceivers. For example, a location of the computing system 800 can be determined based on signal strength of signals as received at the computing system 800 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 800 such as a router, modem, switch, hub, bridge, gateway, or repeater. These may also include Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 860 may include receivers or transceivers corresponding to one or more of these GNSS systems.

Display system 870 may include a liquid crystal display (LCD), a plasma display, an organic light-emitting diode (OLED) display, an electronic ink or "e-paper" display, a projector-based display, a holographic display, or another suitable display device. Display system 870 receives textual and graphical information, and processes the information for output to the display device. The display system 870 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 880 may include any type of computer support device to add additional functionality to the computer system. For example, peripheral device(s) 880 may include one or more additional output devices of any of the types discussed with respect to output device 850, one or more additional input devices of any of the types discussed with respect to input device 860, one or more additional display systems of any of the types discussed with respect to display system 870, one or more memories or mass storage devices or portable storage devices of any of the types discussed with respect to memory 820 or mass storage 830 or portable storage 840, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 800 of FIG. 8 can include those typically found in computer systems that may be suitable for use with some aspects of the subject technology and represent a broad category of such computer components that are well known in the art. That said, the computer system 800 of FIG. 8 can be customized and specialized for the purposes discussed herein and to carry out the various operations discussed herein, with specialized hardware components, specialized arrangements of hardware components, and/or specialized software. Thus, the computer system 800 of FIG. 8 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 800 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 800 may also use a Basic Input/Output System (BIOS) or Unified Extensible Firmware Interface (UEFI) as a layer upon which the operating system(s) are run.

In some cases, the computer system 800 may be part of a multi-computer system that uses multiple computer systems 800, each for one or more specific tasks or purposes. For example, the multi-computer system may include multiple computer systems 800 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 800 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 820, the mass storage 830, the portable storage 840, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L8), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 810 for execution. A bus 890 carries the data to system RAM or another memory 820, from which a processor 810 retrieves and executes the instructions. The instructions received by system RAM or another memory 820 can optionally be stored on a fixed disk (mass storage device 830/portable storage 840) either before or after execution by processor 810. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 800 discussed herein, and may be performed automatically (e.g., in response to one or more triggers/conditions described herein), autonomously, semiautonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method for generating a user profile and tracking transactions related to the user profile via one or more servers of a payment service, the method comprising:
storing, in a data store maintained by the payment service, an association of a first card identifier and a second card identifier with a physical transaction card, the association stored before a purchase of the physical transaction card from a first merchant by a user, wherein the physical transaction card is stored in a packaging before the purchase, wherein the packaging conveys the first card identifier to a merchant point of sale (POS) device;
receiving, at the payment service and from the merchant POS device, the first card identifier and a numerical balance associated with the physical transaction card in response to the purchase of the physical transaction card from the first merchant, the merchant POS device having identified the first card identifier from the packaging;
associating the numerical balance with the first card identifier and the physical transaction card at the payment service in response to receiving the first card identifier from the merchant POS device;
receiving, at the payment service and from a software application executing on a mobile device associated with the user, an indication that the mobile device has received the second card identifier associated with the physical transaction card;
upon receiving the indication that the mobile device has received the second card identifier from the software application executing on the mobile device, executing instructions by one or more processors, wherein execution of the instructions by the one or more processors cause the one or more processors to:
verify, by the payment service and based on the stored association, that the first card identifier and second card identifier correspond to the physical transaction card,
generate, by the payment service, the user profile associated with the user and including user information from the mobile device, and
link, by the payment service, the physical transaction card and the numerical balance with the user profile automatically based on the verification,
transmitting, from the payment service to the mobile device, the numerical balance associated with the physical transaction card, causing the software application executed by the mobile device to display the numerical balance via a user interface; and
upon receiving an indication that the physical transaction card is used for a transaction between the user and a second merchant, modifying the numerical balance associated with the physical transaction card, wherein modifying the numerical balance causes the numerical balance as modified to be displayed via the user interface of the software application executed by the mobile device.

2. The method of claim 1, further comprising:
receiving, from a second merchant POS device associated with the second merchant, card information read from the physical transaction card by the second merchant POS device;
retrieving the numerical balance associated with the physical transaction card in response to receipt of the card information from the second merchant POS device; and
transmitting the numerical balance to the second merchant POS device in response to receipt of the card information.

3. The method of claim 1, further comprising:
receiving, from a second merchant POS device associated with the second merchant, card information read from the physical transaction card by the second merchant POS device;
receiving, from the second merchant POS device associated with the second merchant, a transaction amount associated with the transaction between the user and the merchant;
retrieving the numerical balance associated with the physical transaction card in response to receipt of the card information from the second merchant POS device; and
transmitting, to the second merchant POS device, a notification identifying whether the transaction amount associated with the transaction between the user and the second merchant exceeds the numerical balance.

4. The method of claim 1, further comprising:
receiving, from a second merchant POS device associated with the second merchant, a user profile identifier associated with the user profile as received by second merchant point of sale device from the mobile device during the transaction;
retrieving the numerical balance associated with the physical transaction card in response to receipt of the user profile identifier from the second merchant POS device; and
transmitting the numerical balance to the second merchant POS sale device.

5. The method of claim 1, further comprising:
receiving, from a second merchant POS device associated with the second merchant, a user profile identifier associated with the user profile as received by second merchant POS device from the mobile device during the transaction;
receiving, from the second merchant POS device associated with the second merchant, a transaction amount associated with the transaction between the user and the second merchant;
retrieving the numerical balance associated with the physical transaction card in response to receipt of the user profile identifier from the second merchant POS device; and
transmitting, to the second merchant point of sale device, a notification identifying whether the transaction amount associated with the transaction between the user and the second merchant exceeds the numerical balance.

6. The method of claim 1, wherein the indication that the mobile device has received the second card identifier associated with the physical transaction card is an indication that an optical scanner of the mobile device has scanned an optical glyph encoding at least the second card identifier, wherein the optical glyph includes at least one of a barcode or a quick response ("QR") code.

7. The method of claim 1, wherein the indication that the mobile device has received the second card identifier associated with the physical transaction card is an indication that a near field communication (NFC) transceiver of the mobile device has received an NFC signal from NFC circuitry associated with the physical transaction card, the NFC signal conveying at least the second card identifier.

8. The method of claim 1, further comprising receiving, at the payment service and from the mobile device associated with the user, user identifying information identifying the user, wherein generating the user profile associated with the user includes incorporating the user identifying information into the user profile, wherein the user identifying information includes at least one of a username, a password, a legal name, an address, a date of birth, a social security number, or a government-issued identification code.

9. The method of claim 1, further comprising:
receiving, at the payment service, an indication that the physical transaction card was used in a second transaction before generating the user profile; and
modifying the numerical balance associated with the physical transaction card based on the second transaction before generating the user profile.

10. A system including one or more servers of a payment service, the system comprising:
one or more non-transitory storage media that store an association between a first card identifier and a second card identifier with a transaction card, the association stored before a user purchases the transaction card from a first merchant, wherein the transaction card is stored in a packaging before the purchase, wherein the packaging conveys the first card identifier to a merchant point of sale (POS) device, wherein the one or more non-transitory storage media also store instructions;
one or more communication transceivers that:
receive the first card identifier and a numerical balance associated with the transaction card from the merchant POS device in response to the user purchasing the transaction card from the first merchant, the merchant POS device having identified the first card identifier from the packaging,
receive an indication that a mobile device associated with the user has received the second card identifier associated with the transaction card, and
transmit the numerical balance associated with the transaction card after linking the transaction card with a user profile, causing the mobile device to display the numerical balance via a user interface; and
one or more processors that execute the instructions, wherein execution of the instructions by the one or more processors cause the one or more processors to:
verify, based on the stored association, that the second card identifier corresponds to the transaction card in response to receipt of the indication that the mobile device has received the second card identifier,
generate the user profile associated with the user in response to receiving the indication that the mobile device has received the second card identifier associated with the transaction card, wherein the user profile is automatically linked to the transaction card upon generation of the user profile in response to the verification, and
modify the numerical balance associated with the transaction card in response to receipt of each of one or more indications of use of the transaction card during one or more transactions between the user and one or more merchants, wherein modifying the numerical balance causes the mobile device to display via the user interface the numerical balance as modified.

11. The system of claim 10, wherein the transaction card includes an integrated circuit (IC) chip that is read by one or more merchant point of sale (POS) devices associated with the one or more merchants during the one or more transactions.

12. The system of claim 10, wherein the transaction card includes a magnetic stripe that is read by one or more merchant point of sale (POS) devices associated with the one or more merchants during the one or more transactions.

13. The system of claim 10, wherein the transaction card includes a near field communication (NFC) tag that wirelessly communicates with one or more merchant point of sale (POS) devices associated with the one or more merchants during the one or more transactions.

14. The system of claim 10, wherein the one or more communication transceivers further receive an indication that the transaction card was used in a transaction before generation of the user profile, wherein execution of the instructions by the one or more processors cause the one or more processors to modify the numerical balance associated with the transaction card based on the transaction before generating the user profile.

15. The system of claim 10, wherein the indication that the mobile device has received the second card identifier associated with the transaction card is an indication that an optical scanner of the mobile device has scanned an optical glyph encoding at least the second card identifier, wherein the optical glyph includes at least one of a barcode or a quick response ("QR") code.

16. The system of claim 10, wherein the indication that the mobile device has received the second card identifier associated with the transaction card is an indication that a near field communication (NFC) transceiver of the mobile device has received an NFC signal from NFC circuitry on one of the transaction card or a package covering at least part of the transaction card, the NFC signal conveying at least the second card identifier.

17. A method comprising:
receiving, by a payment service system and from a merchant point of sale (POS) device, a first card identifier and a numerical balance, the merchant POS device having identified the first card identifier from a packaging storing a transaction card;
associating in a data store, by the payment service system, the numerical balance with the transaction card;
receiving, by the payment service system and from an application executing on a mobile device associated with a user, an indication that the user has received a second card identifier associated with the transaction card;
upon receiving the indication from the application, executing instructions by one or more processors, wherein execution of the instructions by the one or more processors cause the one or more processors to:
verify that the second card identifier corresponds to the transaction card based on an association of the second card identifier and the transaction card being already stored in the data store,
generate a user profile associated with the user in response to receiving the indication that the mobile device has received the second card identifier associated with the transaction card, and
automatically link the user profile to the transaction card in the data store;
transmitting, from the payment service system to the mobile device, the numerical balance associated with the transaction card, causing a software application executed by the mobile device to display the numerical balance via a user interface; and
modifying the numerical balance corresponding to the transaction card in response to receipt of each of one or more indications of use of the transaction card during one or more transactions between the user and one or more merchants.

18. The method of claim 17, further comprising:
receiving an indication that the transaction card was used in a second transaction before generating the user profile; and
modifying the numerical balance associated with the transaction card based on the second transaction before generating the user profile.

19. The method of claim 17, wherein the indication that the mobile device has received the second card identifier associated with the transaction card is an indication that an optical scanner of the mobile device has scanned an optical glyph encoding at least the second card identifier, wherein the optical glyph includes at least one of a barcode or a quick response ("QR") code.

20. The method of claim 17, wherein the indication that the mobile device has received the second card identifier associated with the transaction card is an indication that a near field communication (NFC) transceiver of the mobile device has received an NFC signal from NFC circuitry, the NFC signal conveying at least the second card identifier.

* * * * *